United States Patent
Gao et al.

(10) Patent No.: US 9,651,363 B2
(45) Date of Patent: May 16, 2017

(54) SYSTEMS AND METHODS OF OBJECT MEASUREMENT IN AN AUTOMATED DATA READER

(71) Applicant: Datalogic USA, Inc., Eugene, OR (US)

(72) Inventors: WenLiang Gao, Eugene, OR (US); Bryan L. Olmstead, Eugene, OR (US); Alan Shearin, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 304 days.

(21) Appl. No.: 13/949,016

(22) Filed: Jul. 23, 2013

(65) Prior Publication Data
US 2014/0028837 A1   Jan. 30, 2014

Related U.S. Application Data

(60) Provisional application No. 61/675,260, filed on Jul. 24, 2012.

(51) Int. Cl.
*H04N 7/18* (2006.01)
*B60R 21/16* (2006.01)
(Continued)

(52) U.S. Cl.
CPC .......... *G01B 11/04* (2013.01); *G01B 11/0608* (2013.01); *G01S 17/89* (2013.01);
(Continued)

(58) Field of Classification Search
CPC .... G01B 11/04; G01B 11/02; G06K 7/10792; H04N 7/18
(Continued)

(56) References Cited

U.S. PATENT DOCUMENTS 4,842,411 A   6/1989 Wood
5,414,268 A   5/1995 McGee
(Continued)

FOREIGN PATENT DOCUMENTS

DE   202011051565 U1   11/2011
JP   2001-167225 A   6/2001
KR   10-2005-0066789 A   6/2005

OTHER PUBLICATIONS

International Search Report and Written Opinion of International Searching Authority, International Application No. PCT/US2013/051719, mailed Nov. 6, 2013.
(Continued)

*Primary Examiner* — Thai Tran
*Assistant Examiner* — Syed Hasan
(74) *Attorney, Agent, or Firm* — Stoel Rives LLP

(57) ABSTRACT

Systems and methods of determining object dimensions of objects passed through a read zone of an automated data reader are disclosed. A system can include a data reader to read an optical code disposed on the objects, a transport mechanism, an object measurement system to measure dimensions of objects that are transported by the transport mechanism, a light plane generator to project a light plane that produces a light stripe on an object, and a camera to capture image data of objects and a light stripe thereon that can be processed to determine a deviation of a light stripe relative to an optical center within the image data. A deviation from the optical center is used to determine one or more dimensions of the object.

21 Claims, 15 Drawing Sheets

(51) Int. Cl.

| | |
|---|---|
| *G06K 7/10* | (2006.01) |
| *G06K 15/00* | (2006.01) |
| *G09G 3/36* | (2006.01) |
| *G01B 11/04* | (2006.01) |
| *G01S 17/89* | (2006.01) |
| *G06Q 20/20* | (2012.01) |
| *G01B 11/06* | (2006.01) |
| *G07G 1/00* | (2006.01) |
| *G09G 3/34* | (2006.01) |

(52) U.S. Cl.
CPC ......... *G06K 7/10792* (2013.01); *G06Q 20/20* (2013.01); *G07G 1/0063* (2013.01); *H04N 7/18* (2013.01); *G09G 3/3406* (2013.01)

(58) Field of Classification Search
USPC ............... 348/136; 235/383, 462.13, 462.14; 280/735; 345/102
See application file for complete search history.

(56) References Cited

U.S. PATENT DOCUMENTS

| | | |
|---|---|---|
| 5,609,223 A | 3/1997 | Iizaka et al. |
| 5,661,561 A | 8/1997 | Wurz et al. |
| 5,923,428 A | 7/1999 | Woodworth |
| 5,991,041 A | 11/1999 | Woodworth |
| 6,137,577 A | 10/2000 | Woodworth |
| 6,775,012 B2 | 8/2004 | Wurz |
| 6,795,200 B1 | 9/2004 | Barman et al. |
| 6,971,580 B2 | 12/2005 | Zhu et al. |
| 7,084,989 B2 | 8/2006 | Johannesson et al. |
| 7,104,453 B1 | 9/2006 | Zhu et al. |
| 7,137,556 B1 | 11/2006 | Bonner et al. |
| 7,527,205 B2 | 5/2009 | Zhu et al. |
| 7,602,505 B2 | 10/2009 | Kaltenbach |
| 2003/0201968 A1* | 10/2003 | Itoh ..................... G09G 3/3611 345/102 |
| 2005/0111700 A1* | 5/2005 | O'Boyle ............ G06K 9/00201 382/104 |
| 2006/0261157 A1 | 11/2006 | Ostrowski et al. |
| 2008/0035390 A1 | 2/2008 | Wurz |
| 2009/0095047 A1 | 4/2009 | Patel et al. |
| 2009/0134221 A1* | 5/2009 | Zhu ........................ A47F 9/046 235/383 |
| 2010/0163626 A1 | 7/2010 | Olmstead |
| 2011/0315770 A1 | 12/2011 | Patel et al. |

OTHER PUBLICATIONS

International Search Report and Written Opinion for PCT/US2013/051719 filed Jul. 23, 2013, mailed Nov. 6, 2013.

\* cited by examiner

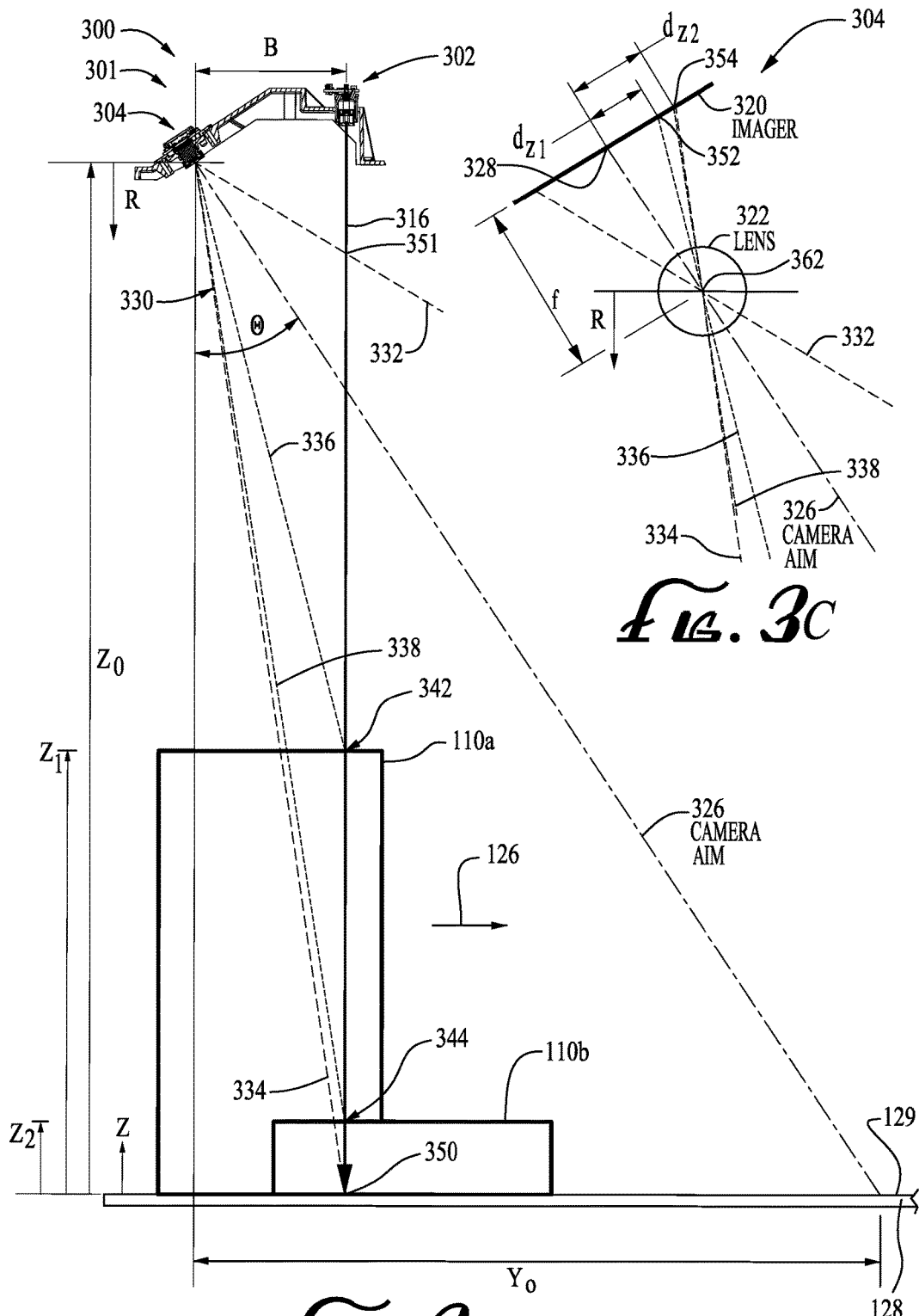

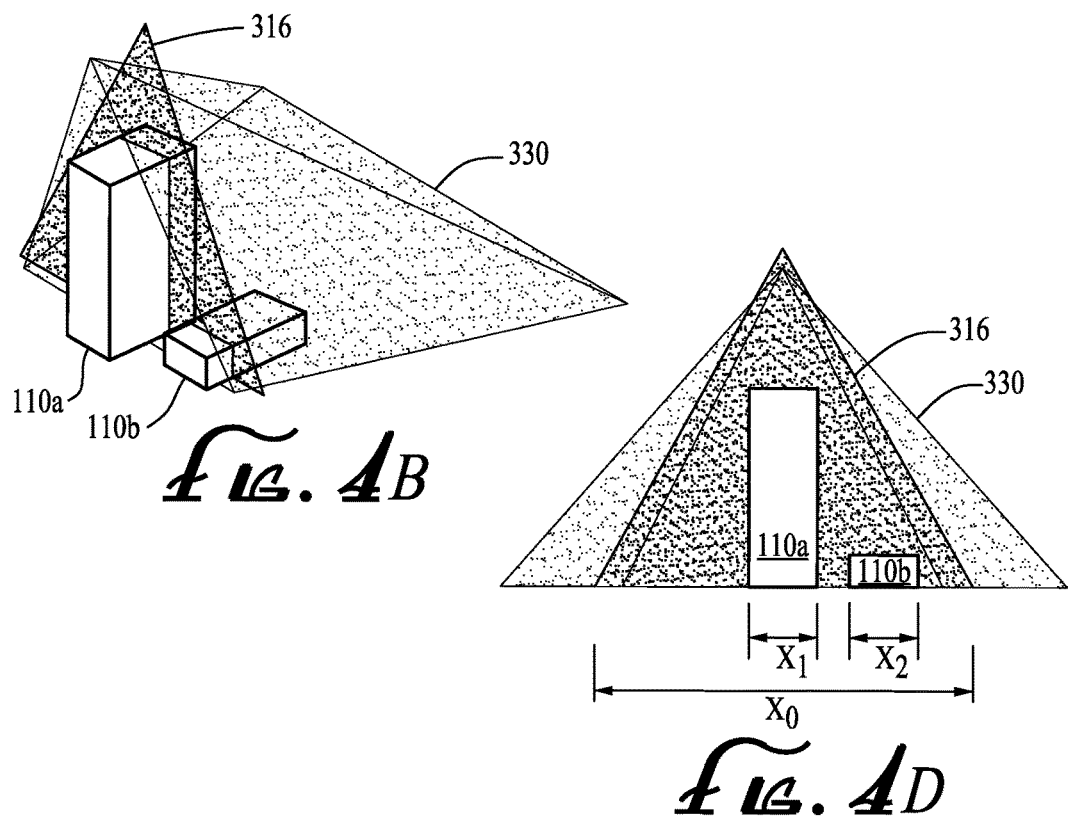
FIG. 4B
FIG. 4D
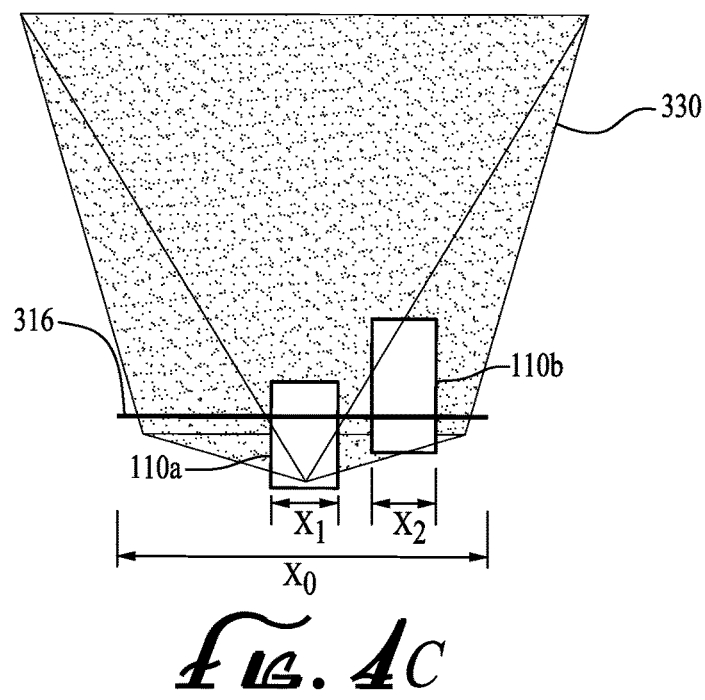
FIG. 4C

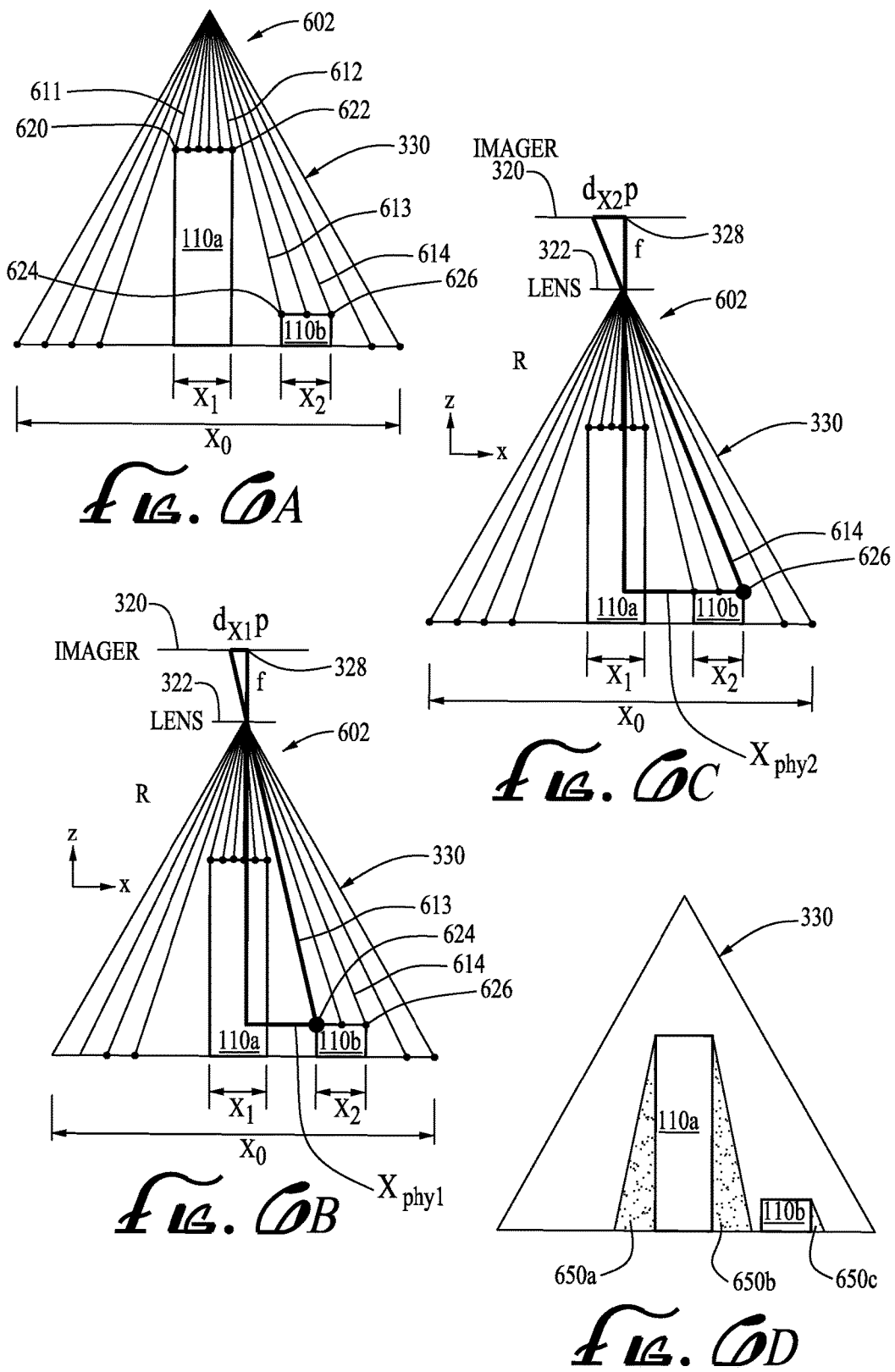

SYSTEMS AND METHODS OF OBJECT MEASUREMENT IN AN AUTOMATED DATA READER

RELATED APPLICATIONS

This application claims the benefit under 35 U.S.C. §119 (e) of U.S. Provisional Patent Application No. 61/675,260, filed Jul. 24, 2012, and titled SYSTEMS AND METHODS OF OBJECT MEASUREMENT IN AN AUTOMATED DATA READER, which is hereby incorporated herein by reference in its entirety.

BACKGROUND

The present disclosure relates generally to systems and methods for measuring object dimensions in an automated data reader.

Optical codes encode useful, optically-readable information about the objects to which they are attached or otherwise associated. Perhaps the best example of an optical code is the barcode. Barcodes are found on or associated with objects of various types, such as the packaging of retail, wholesale, and inventory goods; retail product presentation fixtures (e.g., shelves); goods undergoing manufacturing; personal or company assets; and documents. By encoding information, a barcode typically serves as an identifier of an object, whether the identification be to a class of objects (e.g., containers of milk) or a unique item.

Various types of optical code readers, also known as scanners, such as manual readers, semi-automatic readers and automated readers, are available to acquire and decode the information encoded in optical codes. In an automated reader (e.g., a portal or tunnel scanner), an object is automatically positioned relative to the reader (e.g., transported through a read zone via a conveyor), and the reader automatically reads the optical code on the object.

When an automated reader attempts to read identifying information on an object, an error may occur. For example, under some circumstances one or more sides of an object cannot be effectively read because one object may be stacked on top of another object or one object may shadow or block another object. If an object is not successfully read by the automated reader, an error or exception situation occurs. The error or exception situation needs to be corrected or otherwise resolved for proper functioning of the system. In the case of a retail point of sale (POS) environment in which an automated reader may be used as part of a system to total the cost of items purchased, the cost of an unscanned item may not be added to the total purchase amount unless the item is rescanned or the information of the item is manually entered into a POS terminal. An automated reader needs to determine automatically whether an error or an exception situation occurs and, if such an error or exception situation occurs, take appropriate action to address the exception. Thus, accurate identification and handling of errors and unexpected events that occur in automated readers may be desirable.

BRIEF DESCRIPTION OF THE DRAWINGS

FIG. 3B is a side view of the object measurement system of FIG. 3A, illustrating a camera field of view (FOV) and a laser plane in relation to the transport plane.

FIG. 3C is an enlarged diagrammatic view of an imager of the camera and a deviation (from the optical center of the imager) of a ray from an intersection of an object and the laser plane.

FIG. 4B is a perspective view of the FOV in relation to the laser plane of FIG. 4A.

FIG. 4C is a top view of the FOV in relation to the laser plane of FIG. 4A.

FIG. 4D is a front view of the FOV in relation to the laser plane of FIG. 4A.

FIG. 6A is a front view of a FOV of a camera of an object measurement system, according to one embodiment, illustrating a pattern of rays to the camera.

FIGS. 6B and 6C are close-up front views of the FOV of the camera of the object measurement system of FIG. 6A, illustrating similar triangles from which a width measurement can be determined.

FIG. 6D is a front view of the FOV of the camera of the object measurement system illustrating shadow regions, according to one embodiment.

DETAILED DESCRIPTION OF PREFERRED EMBODIMENTS

With reference to the above-listed drawings, particular embodiments and their detailed construction and operation will be described herein. The embodiments described herein are set forth by way of illustration only and not limitation. It should be recognized in light of the teachings herein that other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

I. Automated Optical Code Reading

Figure 1:
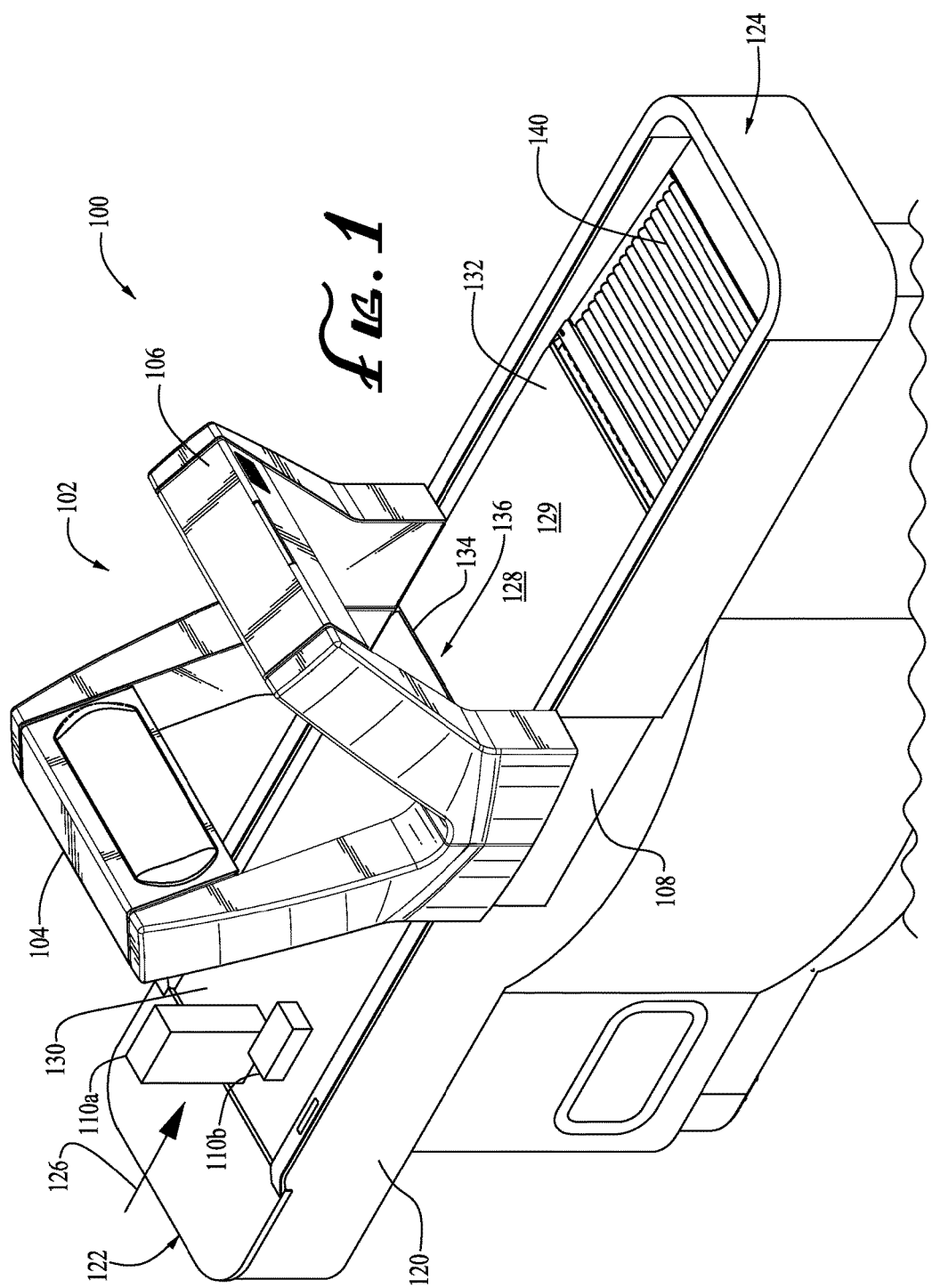
FIG. 1 is an isometric view of an automated optical code reading system, according to one embodiment.
Figure 2:
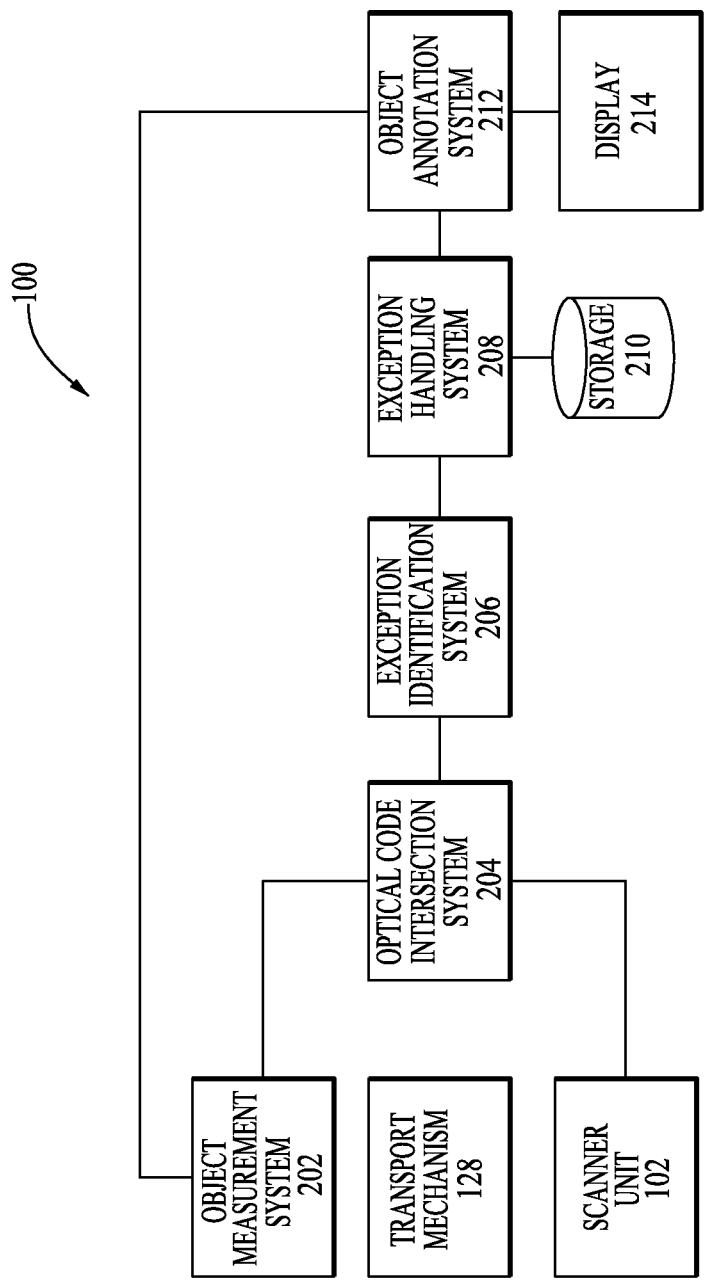
FIG. 2 is a block diagram of an automated optical code reading system, according to one embodiment.

FIG. 1 is an isometric view of an automated optical code reading system 100, according to one embodiment. The system 100 may include a data reader 102 and a transport mechanism 128. In the illustrated system 100, the data reader 102 may be in the form of a portal scanner and may be installed on a counter unit 120. The counter unit 120 may house the transport mechanism 128, which may be in the form of a conveyor system operative to automatically transport items through the scanning volume of the data reader 102. The system 100 may include other components that are not shown in FIG. 1, but that are depicted in FIG. 2 and described below with reference to the same, including but not limited to an object measurement system, an optical code intersection system, an exception identification system, an exception handling system, and an object annotation system.

The data reader 102 may be configured to scan objects 110a, 110b (collectively and/or generally object 110) that are passed or transported through the data reader 102, for example, to identify the objects. The data reader 102 may capture image data of objects passed therethrough or may otherwise read or scan the objects passed therethrough. The data reader 102 may include a front arch section 104 and a rear arch section 106. The front arch section 104 and the rear arch section 106 of the data reader 102 each form an archway over a central portion of the conveyor system 128 and are configured such that the data reader 102 may be partially open and partially enclosed, as illustrated in FIG. 1. The configuration of the dual arch sections 104, 106 creates an open architecture that may provide some barrier or inhibition from a customer reaching into the scanning volume of the data reader 102, yet provide sight lines for allowing the customer to generally continuously observe objects passing through the data reader 102. In another embodiment, the data reader 102 may be fully enclosed in the form of a tunnel enclosure. However, the data reader 102 need not include any tunnel or even semi-enclosed arches. A suitable data reader 102 may be constructed with more or less openness than the illustrated embodiment of FIG. 1.

The front arch section 104 and rear arch section 106 may include multiple data capture devices operative to capture information corresponding to an object 110 that passes through the arch sections 104, 106. Each of the multiple data capture devices may define a read zone, which collectively may define or form a three-dimensional scanning volume 136. The scanning volume 136 may be located within or near the arch sections 104, 106. As an object 110 passes through the arch sections 104, 106 and into the one or more read zones or three-dimensional scanning volume 136, the scanning unit 102 may capture information corresponding to the object 110, such as image data of the object 110.

The objects 110 illustrated in FIG. 1 being moved by the transport mechanism 128 through the read zone or scanning volume 136 may be six-sided box-shaped packages. However, it should be appreciated that the objects 110 may be any of a number of different shapes. Moreover, although a pair of objects 110 is depicted, It should be appreciated that a single object 110 or any plurality of objects may be passed through the data reader 102 and the objects 110 that are shown may be representative of any number of objects 110.

The counter unit 120 may support the data reader 102 and the transport mechanism 128. The counter unit 120 may include an inlet end 122 and an outlet end 124. A collection area 140 may be positioned at the outlet end 124. In a retail POS environment, the collection area 140 may be where scanned objects 110 (e.g., items to be purchased) can be bagged or otherwise collected by a customer, a checkout clerk, or other user or operator.

The transport mechanism 128 may comprise one or more various types of mechanical conveying systems operable to move objects 110 through the scanning volume 136 of the data reader 102. The illustrated transport mechanism 128 may comprise a conveyor system operable to move objects 110 in a longitudinal direction or scanning direction 126 and may move the objects at a relatively fast rate (e.g., 200-400 millimeters/second (mm/sec)). The transport mechanism 128 may comprise an inlet conveyor section 130 and an outlet conveyor section 132. The transport mechanism 128 moves objects 110 relative to the data reader 102. A top surface of the transport mechanism 128 may define a transport plane 129. One or more objects 110 are placed on the inlet conveyor section 130 and transported on (e.g., within) the transport plane 129 in a scanning direction (indicated by direction arrow 126) through the interior of the data reader 102 and then transported out of the interior via the outlet conveyor section 132. The objects 110 to be scanned are automatically transferred from the inlet conveyor section 130 to the outlet conveyor section 132 for transport through and out of the arch sections 104, 106 to the collection area 140.

As the objects 110 are passed through the data reader 102, the data capture devices of the arch sections 104, 106 may capture information corresponding to the objects 110. The data capture devices may capture information of the objects 110 by capturing image data of, or otherwise reading, optical codes disposed on the objects 110. For example, the data reader 102 may comprise an optical code reading system. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. An optical code is scanned and/or read by the data reader 102 to create electrical signals. The electrical signals can be decoded into alphanumerical characters or other data that can be used as input to a data processing system, such as a point of sale (POS) terminal (e.g., an electronic cash register). The POS terminal, for example, can use the decoded data to look up a price for the item, apply electronic coupons, and award points for a retailer or other rewards program. Scanning an optical code on objects 110, such as items for purchase, may enable, for example, rapid totaling of the prices of multiple such items.

In other embodiments, the data reader 102 may capture image data to identify features of objects 110 that may be used to identify the objects 110. For example, features such as corners, edges, curves and the like may be identified by the data reader. In still other embodiments, watermarks or other identifiers may be captured by the data reader 102 and used to identify objects 110.

The data capture devices of the data reader 102 may be configured to capture (i.e., scan or read) multiple sides of an object 110 as the object 110 passes through the data reader 102. For example, the data reader 102 may include side data capture devices (e.g., customer side and operator side), front data capture devices, rear data capture devices, and top data capture devices. The data reader 102 may also include a bottom reader section 108 that includes data capture devices to scan the bottom side of objects 110 as they pass through the data reader 102. A gap 134 at a transition between the inlet conveyor section 130 and the outlet conveyor section 132 may allow, for example, bottom data capture devices housed in the bottom reader section 108 to capture images of the bottom side of objects 110 for reading optical codes on the bottom side of objects 110 as they are passed over the gap 134.

The data capture devices of the data reader 102 may include various data capture components, such as an imaging device or sensor array. Examples of an imaging device may include a CCD (charge coupled device) device or a CMOS (complementary metal oxide semiconductor) device. The imaging device generates electronic image data, typically in digital form. The image data can then be processed, for example, to find and decode an optical code on the object 110. An imaging device can be configured to read both 1-D and 2-D optical codes, as well as other types of optical codes or symbols and images of other items.

Details of examples of a data reader 102 (or other data capture system or optical code reading system) are further described in U.S. patent application Ser. No. 13/357,356, entitled "TUNNEL OR PORTAL SCANNER AND METHOD OF SCANNING FOR AUTOMATED CHECKOUT," filed Jan. 24, 2012, in U.S. patent application Ser. No. 13/357,459, entitled "EXCEPTION DETECTION AND HANDLING IN AUTOMATED OPTICAL CODE READING SYSTEMS," filed Jan. 24, 2012, and in U.S. patent application Ser. No. 13/942,620, entitled "PORTAL DATA READER INDICATOR LIGHT CONTROL," filed Jul. 15, 2013. Each of these applications is hereby incorporated herein by reference in its entirety.

Although the data reader 102 may include a plurality of data capture devices to scan a plurality of sides of an object 110, under some circumstances one or more sides of an object 110 cannot be effectively scanned. If an object 110 is not successfully read by the data reader 102, an exception situation (or "exception") occurs. An exception corresponds to an occurrence in which an ideal event does not happen—an ideal event corresponding to when the system 100 successfully reads an optical code and confidently associates the optical code to an object passing through the system 100 (e.g., the optical code is associated with only one object and the object has only one optical code associated with it).

The arch sections 104, 106 may also house illumination source(s). An example of an illumination source is described also in U.S. patent application Ser. No. 13/357,356, which was incorporated herein by reference above.

Various types of exceptions are possible. Examples of exceptions include a "no code" exception (when an object 110 passes through the system 100, but an optical code is not read by the system 100), a "no object" or "phantom read" exception (when an optical code is read, but the system 100 does not detect that an object 110 has passed through the system 100), and a "multiple codes" exception (when multiple different optical codes read by the system 100 are associated with one object passing through the system 100), and a "multiple objects" exception (when one optical code read by the system 100 is associated with multiple objects 110 passing through the system 100). Various subsets of the above-described exceptions, as well as other types of exceptions, are possible and applicable to the systems/methods described herein.

The multiple objects exception in particular can be difficult to identify or detect using presently available systems and methods. A multiple objects exception may occur when multiple objects are transported through the data reader 102 in close proximity, particularly multiple objects positioned side-by-side (e.g., across the scanner, transverse to the scanning direction) in close proximity. For example, one object 110 may shadow or block another object 110 or multiple objects 110 may be stacked, such that multiple objects 110 pass through the data reader 102 while only a single optical code is successfully scanned.

An exception situation needs to be corrected or otherwise resolved for proper functioning of the system 100. As an example, if the system 100 is used in a retail point of sale (POS) environment to total the cost of items (objects 110) purchased, the cost of an unscanned item may not be added to the total purchase amount unless the item is rescanned or the information of the item is manually entered into the POS terminal. The system 100 may determine automatically whether an exception situation occurs and, if such an exception situation occurs, take appropriate action to resolve the exception.

In an automated reader, object dimension measurements and position may be useful in determining if all objects are scanned by the system and/or to identify which items may not be scanned and may otherwise be useful in identifying errors or other exception situations. In particular, stacked objects and/or closely adjacent objects may be difficult for an automated reader to identify and/or read (e.g., read an optical code thereon). For example, if two stacked objects are passed through the scanning volume, the automated reader may capture an optical code on one of the stacked objects (successfully scanned object) but not the other (exception object). Determining (e.g., measuring) a height of an apparent object (e.g., two or more stacked objects may appear to an automated scanner to be a single apparent object) enables the determined height of the apparent object to be compared against a known height of the successfully scanned object and a determination can be made if the successfully scanned object may be stacked with an exception object that was not successfully scanned. Similarly, determining (e.g., measuring) a width of an apparent object (e.g., two nominally spaced objects may appear to an automated scanner to be a single apparent object) enables the determined width of the apparent object to be compared against a known width of the successfully scanned object and a determination can be made if the successfully scanned object may be positioned closely adjacent to an exception object that was not successfully scanned. Similarly, determining (e.g., measuring a length of an apparent object enables the determined length of the apparent object to be compared against known length measurement of a successfully scanned object to identify an exception item.

Presently, light curtains may be used to capture object dimension measurements and position. For example, multiple light curtains may be used to measure vertical (e.g., height) and/or horizontal dimensions (e.g., width and/or length) of an object and may provide object position information. Measurements of object dimensions and position using light curtains can pose difficulties when multiple objects are transported through a portal scanner in close proximity, particularly multiple objects positioned side-by-side (e.g., across the scanner, transverse to the scanning direction) in close proximity. Accordingly, the present inventors have recognized a need to accurately obtain measurements of object dimensions and position, including when multiple objects are positioned side-by-side in close proximity.

FIG. 2 is a block diagram of the automated optical code reading system 100, of FIG. 1. As described above, the system 100 may be configured to automatically position objects within or move objects through the one or more read zones or the scanning volume 136, read optical codes disposed on objects 110, and identify when an exception occurs. The system 100 may include various modules or subsystems to perform various tasks. More specifically, the system 100 may include a data reader 102 (or other optical code reading/decoding system), a transport mechanism 128, an object measurement system 202, an optical code intersection system 204, an exception identification system 206, an exception handling system 208, storage 210, an object annotation system 212, and a display 214.

One or more of these subsystems may include a processor, associated software or hardware constructs, and/or memory to carry out certain functions performed by the subsystems. The processors of the subsystems may be embodied in a single central processing unit, or may be distributed such that a subsystem has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The object measurement system 202 may be configured to measure dimensions of objects that are transported through the data reader 102 by the transport mechanism 128. The object measurement system 202 may generate model data that represent three-dimensional models of the objects that are transported by the transport mechanism 128. The object measurement system 202 may include a lateral height sensor (LHS) to measure the dimensions of objects moving through the data reader 102 and/or the system 100. The present application is directed primarily to embodiments of an object measurement system 202, and more particularly to embodiments of a lateral height sensor. The lateral height sensor may be implemented using a range finder. A lateral height sensor, according to one embodiment, is described in greater detail below with reference to FIGS. 3A-3C.

In another embodiment, the object measurement system 202 may include one or more light curtains (e.g., an entry height measurement light curtain and/or an exit height measurement light curtain (EHM/XHM) and a lateral item sensor light curtain (LAT)) or similar sensors to measure dimensions of objects moving through the data reader 102 and/or the system 100. The EHM/XHM and/or LAT may operate in conjunction with an LHS.

The system 100 may also include a data reader 102 or other optical code reading and/or decoding system configured to capture image data of objects 110 passed therethrough (or otherwise read or scan the objects 110 passed therethrough) to capture information corresponding to the objects 110. The data reader 102, shown in FIG. 1, may be operable to capture images of objects 110 as the objects 110 are transported by the transport mechanism 128. The data reader 102 may identify whether optical codes disposed on the objects 110 are captured in the images and may decode the optical codes that are captured. Skilled persons will recognize that the data reader 102 may comprise any of a number of optical code reading systems and may include different decoders (e.g., software algorithms, hardware constructs) to decode various types of optical codes including one-dimensional (e.g., linear) codes (e.g., UPC, codabar, code 25, code 39, code 93, code 128, code 11, EAN8, EAN13, plessey, POSTNET), stacked linear codes (e.g., GS1 Databar, PDF417), and two-dimensional (e.g., matrix) codes (e.g., aztec code, maxicode, QR code, high-capacity color barcode, data matrix).

The data reader 102 also may be operable to generate projection data for optical codes represented in the images it captures. The projection data may represent back projection rays that project into a three-dimensional view volume of the data reader 102. These back projection rays are associated with locations of the representations of the optical codes in the images.

The system 100 may also include an optical code intersection system 204 that is configured to receive the model data from object measurement system 202 and the projection data from data reader 102. The optical code intersection system 204 may use the model data and the projection data to determine whether the back projection rays generated for decoded optical codes intersect with the three-dimensional models.

The system 100 may also include an optional exception identification system 206 in communication with optical code intersection system 204. The exception identification system 206 is configured to determine whether optical codes read by the data reader 102 are associated with three-dimensional models generated by the object measurement system 202. In one example, the exception identification system 206 determines that the optical codes are associated with the three-dimensional models based on intersection determinations made by the optical code intersection system 204. From the associations (or lack of associations) of the optical codes and three-dimensional models, the exception identification system 206 may determine whether one or more exceptions occur. For example, if an object passes through the system 100 and the object measurement system 202 generates a three-dimensional model of the object, but no optical code is associated with the three dimensional model (e.g., no back projection ray of an optical code intersects the three-dimensional model), the exception identification system 206 may identify this event as a "no code" exception. The exception identification system 206 may also be operable to classify and categorize exceptions by types and subtypes and to generate exception category identification information indicative of type and/or subtype of the exception.

The system 100 may also include an optional exception handling system 208 in communication with the exception identification system 206. The exception handling system 208 may determine in what manner to handle (e.g., resolve) an exception identified by the exception identification system 206. The manner in which to handle the exception may be determined based on the type of the exception. To this end, the exception category identification information generated by the exception identification system 206 is communicated to the exception handling system 208. The exception handling system 208 may be operable to determine that an exception can be resolved in one of multiple ways. For example, the exception handling system 208 may determine that an exception is to be automatically resolved (e.g., ignoring the exception) or manually resolved by an operator. The exception handling system 208 may communicate with an optional storage device 210 that may store various types of information associated with exceptions.

The system 100 may also include an optional object annotation system 212 that is operable to generate annotated image data corresponding to visual representations of exceptions to enable an operator (e.g., checkout clerk, customer, etc.) to easily identify which objects transported through the system 100 have exceptions associated with them. The annotated image data generated by the object annotation system 212 are communicated to a display 214, which displays the visual representations of the exceptions.

Additional details of an example automated optical code reading system 100, an example data reader 102 (or other optical code reading/decoding system), an example transport mechanism 128 (or other conveyor system), an example object measurement system 202, an example optical code intersection system 204, an example exception identification system 206, an example exception handling system 208, and an example object annotation system 212 are further described in U.S. patent application Ser. No. 13/357,459, which was incorporated herein by reference above.

II. Object Measurement

In an automated optical code reading system, object dimension and position measurements may be useful in determining if all objects are scanned by the system and/or to identify which items may not be scanned and may otherwise be useful in identifying errors or other exception situations. In particular, stacked objects and/or closely adjacent objects can be difficult to identify and/or read (e.g., read an optical code thereon). The object measurement system 202 of the system 100 may be configured to determine object dimension measurements and/or position.

Figure 3A:
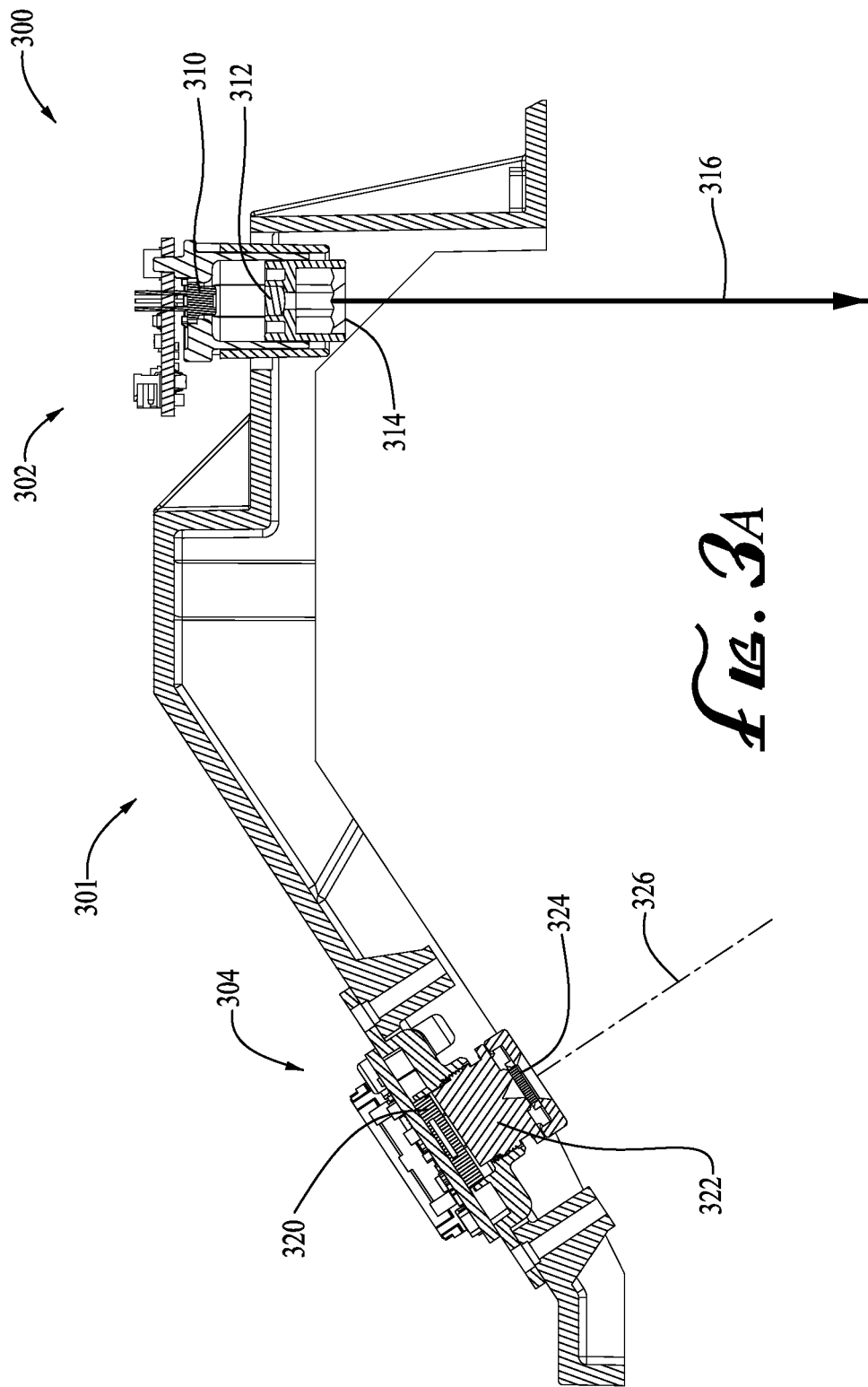
FIG. 3A is a cross-sectional side view of an object measurement system of an automated optical code reading system, according to one embodiment.

FIGS. 3A, 3B, and 3C are cross-sectional side views of an object measurement system 300 of an automated optical code reading system, according to one embodiment. Specifically, FIG. 3A is a cross-sectional side view of the object measurement system 300, FIG. 3B is a widened side view of the object measurement system 300 and illustrates a camera field of view (FOV) 330 and a laser plane 316 in relation to the transport plane 129, and FIG. 3C is an enlarged diagrammatic view of an imager 320 of a camera 304 of the object measurement system 300.

Referring collectively to FIGS. 3A, 3B, and 3C, the object measurement system 300 may comprise a lateral height sensor (LHS) implemented by a range finder, such as a laser range finder 301. The object measurement system 300 may include a light plane generator 302, such as a laser plane generator 302, and a camera 304. The laser plane generator 302 may be configured to generate a light plane 316, such as a laser plane 316, through which a first object 110a and a second object 110b (collectively 110) pass. The camera 304 captures image data of the objects 110 and the laser plane 316 and/or a light stripe 502, such as a laser stripe 502 (see FIG. 5), that is generated where the laser plane 316 intersects or strikes an object 110 and/or the transport mechanism 128.

The laser plane generator 302 may include an infrared (IR) laser 310 (or any other suitable light source), a focusing lens 312, and a diverging lens 314 (e.g., a Powell lens). The laser plane generator 302 generates and directs a laser plane 316 vertically downward onto the transport mechanism 128 normal or perpendicular to, or approximately normal to, the transport plane 129. More specifically, the IR laser 310 and focusing lens 312 direct a beam of infrared light downward and the diverging lens 314 diverges or fans the beam to generate the laser plane 316 across the transport mechanism 128, as illustrated in FIGS. 4A-4D. The term perpendicular as used herein can include both exactly perpendicular (i.e., orthogonal, forming a ninety degree angle) and closely or approximately perpendicular (e.g., within a few degrees, such as five degrees, of orthogonal, forming a ninety degree angle).

In other embodiments, a light plane generator 302 may include a focused light source and other components to generate and direct a light plane vertically downward across the transport mechanism 128 and produce a light stripe.

The camera 304 may include an imager 320 and an imager lens 322. The camera 304 has a focal length f (see FIG. 3C). The imager 320 and/or imager lens 322 define an optical center 328, which in turn defines a camera aim 326 (or optical axis or optical centerline) of the camera 304. The camera aim 326 may be a line of sight of the camera 304. The camera aim 326 may also be considered to be aligned with a ray (or path) of light directed through and/or to the optical center 328 of the imager 304. The camera 304 may further include an IR filter 324 to pass the IR light of the laser plane 316 while blocking other light, including ambient light, from passing to the imager 304. The camera 304 is offset a distance B from the laser plane generator 302 and has a field of view (FOV) 330 directed downward toward the transport mechanism 128 and at an angle θ toward the laser plane 316. For example, the angle θ may be 31.7 degrees. The angle θ may be a vergence angle between the camera optical axis 326 and the laser optical axis, which may be aligned with the laser plane 316 generated by the laser plane generator 302. In the illustrated embodiment of FIG. 3B, because the laser 310 may be directed straight down, the angle θ may be an angle between the camera aim 326 and vertical. The offset distance B may be a distance in a direction opposite the scanning direction 126 (see FIG. 1). A first edge 332 of the camera FOV 330 may capture (and/or intersect) the laser plane 316 at a point 351 (e.g., a near field extreme) above the transport plane 129. A second edge 334 of the camera FOV 330 may capture (and/or intersect) the point 350 (e.g., a far field extreme) where the laser plane 316 and the transport mechanism 128 and/or the transport plane 129 intersect. The camera 304 may be configured to capture image data of the laser plane 316 and/or of objects 110 as they pass through the laser plane 316.

As shown in FIG. 3B, the laser plane generator 302 and the camera 304 are disposed above the transport mechanism 128 and/or transport plane 129. The camera 304, in particular, is positioned above the transport plane 129 at a distance $Z_0$. More specifically, a point on a principal plane 362 at the center of the lens 322 of the camera 304 is positioned at a height $Z_0$ from the transport plane 129. The range R of the camera 304 is measured or referred to as the direction from the camera 304 vertically downward toward the transport mechanism while a height of the objects 110 is measured vertically upward from the transport plane 129.

In FIG. 3B, two side-by-side objects 110a, 110b are disposed within the FOV 330 and below the laser plane generator 302 in line with the laser plane 316. The laser plane 316 strikes the objects 110a, 110b. At the intersections 342, 344 where the laser plane 316 intersects or strikes the objects 110a, 110b, respectively, an infrared laser stripe 502 (see FIG. 5) is generated on the top of the objects 110a, 110b. The intersections 342, 344 are viewed (or the view of the intersections 342, 344 is captured) with the imager 320 of the camera 304. The offset distance B causes the position (e.g., the height) of the laser stripe 502 in the camera FOV 330 (and accordingly in an image captured by the imager 320 of the camera 304) to depend on a height of the surface (e.g., object 110, transport plane) on which the laser stripe 502 is generated, as shown in FIG. 5 and described in greater detail below with reference to the same. The phenomenon is often referred to as parallax. Using triangulation, based on a vertical deviation within image data, the height of the object can be determined.

As shown in FIGS. 3B and 3C, a first ray 336 from the intersection 342 of the laser plane 316 and the first object 110a passes through the imager lens 322 and to a first point 352 (e.g., a pixel or row of pixels) on the imager 320. The first point 352 is vertically deviated or offset from the optical center 328 by a vertical pixel deviation of $d_{z1}$ pixels. The size of this vertical deviation can be determined by multiplying the vertical pixel deviation $d_{z1}$ by the size of the individual pixels p (e.g., as measured in meters, millimeters, or the like). Using the vertical pixel deviation $d_{z1}$ and pixel size p, the height $Z_1$ of the first object can be determined using the following equation for height Z:

$$Z = Z_0 - \frac{B}{\tan\left(\theta + \tan^{-1}\left(\frac{d_z p}{f}\right)\right)}. \quad (1)$$

A second ray 338 from the intersection 344 of the laser plane 316 and the second object 110b passes through the imager lens 322 and to a second (different) point 354 (e.g., a pixel or row of pixels) on the imager 320. The second point 354 may be vertically deviated or offset from the optical center 328 by a vertical pixel deviation of $d_{z2}$ pixels. The size of this vertical deviation can be determined by multiplying the vertical pixel deviation $d_{z2}$ by the size of the individual pixels p (e.g., as measured in meters, millimeters, or the like). Using the vertical pixel deviation $d_{z2}$ and pixel size p, the height $Z_2$ of the second object can be determined using the equation (1) above.

Figure 4A:
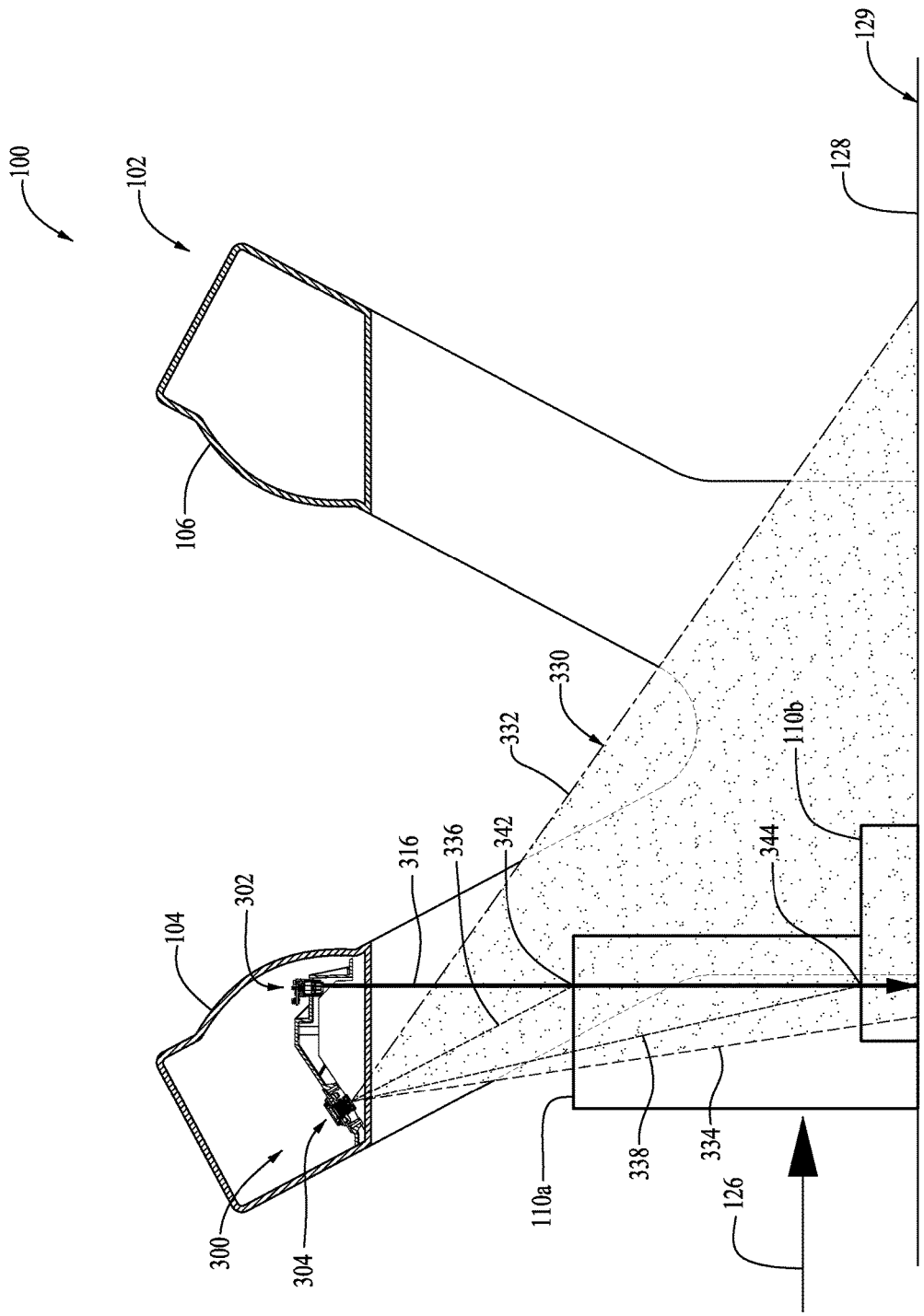
FIG. 4A is a partial sectional side view of the system of FIG. 1 illustrating a FOV of a camera of an object measurement system in relation to a laser plane of the object measurement system, according to one embodiment.

FIG. 4A is a partial sectional side view of the system 100 of FIG. 1 including the object measurement system 300 of FIGS. 3A-3C, according to one embodiment. FIG. 4A illustrates the laser plane 316 of the laser plane generator 302 and the FOV 330 of the camera 304 of the object measurement system 300, in relation to the arch sections 104, 106 of the data reader 102 and to the transport mechanism 128 of the system 100, according to one embodiment. FIGS. 4A-4D are various views of the FOV 330 of the camera 304 in relation to the laser plane 316 and the objects 110a, 110b of FIGS. 3A-3C. FIGS. 4A-4D illustrate an impact or effect of the offset distance B to enable the FOV 330 of the camera 304 to capture image data of the laser plane 316 and/or a laser stripe 502 (FIG. 5) on objects 110a, 110b.

FIGS. 4C and 4D indicate a width $X_0$ of the laser plane 316 as well as width dimensions $X_1$ and $X_2$ of the first object 110a and the second object 110b, respectively. As described in greater detail below, with reference to FIGS. 6A-6C, the object measurement system 300 can measure a width dimension X using similar triangles.

Figures 5A, 5B:
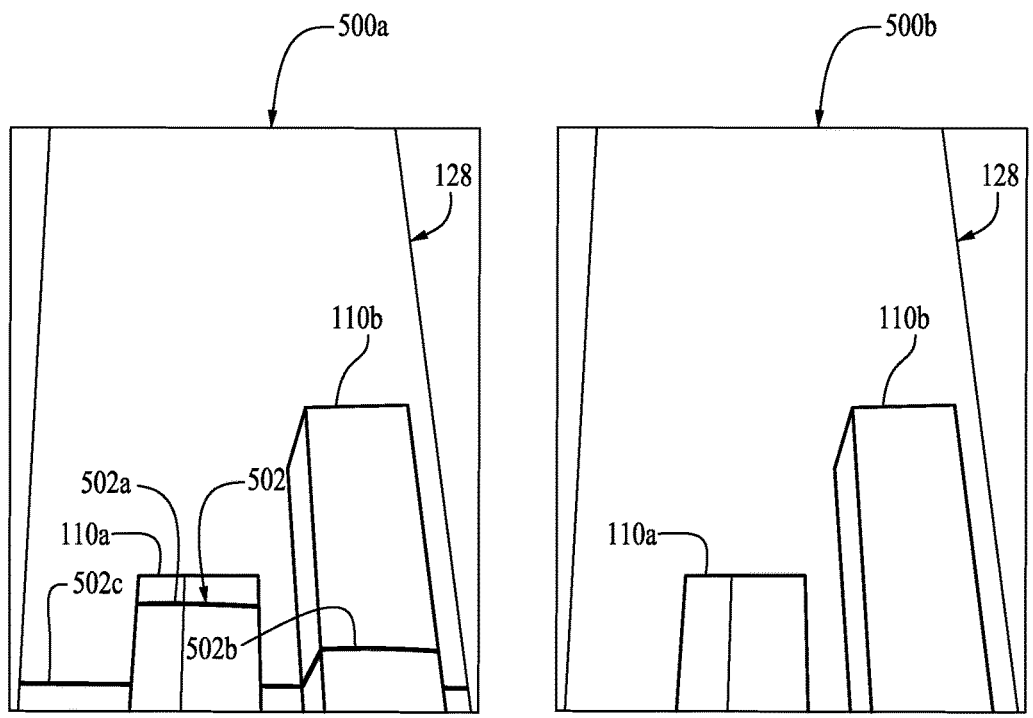
FIG. 5A is a representation of a view of objects as viewed through, or captured by, a camera of an object measurement system with the laser plane on, according to one embodiment.
FIG. 5B is a representation of a view of objects as viewed through, or captured by, a camera of an object measurement system with the laser plane off, according to one embodiment.

FIG. 5A is a representation of a first image 500a captured by a camera, such as the camera 304 (see FIG. 3A), of an object measurement system, such as object measurement system 300, with the laser plane 316 activated, according to one embodiment. The image 500a depicts a scene in the FOV 330 (see FIGS. 3A-3C and 4A-4D) of the camera 304 and includes first and second objects 110a, 110b. In other words, the image 500a provides a perspective from the imager 320 of the objects 110a, 110b. The image 500a also represents the camera's view of the objects 110a, 110b. The image 500a includes a laser stripe 502 generated by the laser plane 316 (see FIGS. 3A-3C and 4A-4D) and portrays the parallax principle that occurs because the camera 304 views the objects 110a, 110b from a different line of sight or perspective than the path of the laser plane 316.

In the image 500a, base portions 502c of the laser stripe 502, which are generated where the laser plane 316 strikes the transport system 128, are at a given position or height within the image 500a, near the bottom of the image 500a. The base portions 502c are at a base position. A first object portion 502a of the laser stripe 502, which is generated where the laser plane 316 strikes the first object 110a, is at a higher position (or lower pixel row) within the image 500a, further from the bottom of the image 500a, than the base portions 502c (e.g., deviated from the base position). The pixels of the image 500a that represent the first object portion 502a of the laser stripe 502 have a vertical offset distance (e.g., a vertical pixel deviation of $d_z$ pixels, such as $d_{z1}$ pixels as illustrated in FIGS. 3B and 3C) from the optical center 328 (see FIGS. 3B and 3C). As can be appreciated, the vertical offset distance of the first object portion 502a is different than a vertical offset distance (e.g., a vertical pixel deviation of $d_z$ pixels) of the pixels that represent the base portions 502c of the laser stripe 502. In other words, the pixels of the image 500a that represent the base portions 502c of the laser stripe 502 are on a different pixel row number of the image 500a than the pixels of the image 500a that represent the first object portion 502a of the laser stripe 502.

A second object portion 502b of the laser stripe 502, which is generated where the laser plane 316 strikes the second object 110b, is at a higher position (or lower pixel row number) within the image 500a than the base portions 502c and at a lower position within the image 500a than the first object portion 502a. The pixels of the image 500a that represent the second object portion 502b of the laser stripe 502 have a vertical offset distance (e.g., a vertical pixel deviation of $d_z$ pixels, such as $d_{z2}$ pixels as illustrated in FIGS. 3B and 3C) from the optical center 328. As can be appreciated, the vertical offset distance of the second object portion 502b is different than the vertical offset distance (e.g., a vertical pixel deviation of $d_z$ pixels) of the pixels that represent the base portions 502c and different than the vertical offset distance (e.g., $d_{z1}$ pixels) of the pixels that represent the first object portion 502a of the laser stripe 502. In other words, the pixels of the image 500a that represent the second object portions 502b of the laser stripe 502 are on a different pixel row number of the image 500a than the pixels of the image 500a that represent the first object portion 502a of the laser stripe 502 and on a different pixel row number of the image 500a than the pixels of the image that represent the base portions 502c of the laser stripe 502 (e.g., $d_{z1}$ is not equal to $d_{z2}$).

Assuming the position of the optical center 328 (see FIGS. 3B-3C) within the image 500a is known, a vertical pixel deviation in number of pixels $d_z$ can be identified by processing the image 500a (or image data) captured by the imager 320 (see FIGS. 3A-3C). For example, a vertical pixel deviation $d_{z1}$ of the first object portion 502a can be determined and then used in the equation (1) above to determine a height $Z_1$ of the first object 110a. Similarly, a vertical pixel deviation $d_{z2}$ of the second object portion 502b can be determined and then used in the equation (1) above to determine a height $Z_2$ of the second object 110b.

By measuring the height of the objects 110a, 110b across the captured image 500, a measurement of the width X of the objects 110a, 110b can be obtained. As is evident from the image 500a represented in FIG. 5, measuring a length of the first object portion 502a of the laser stripe 502 provides a measurement of a width dimension $X_1$ of the first object 110a. Similarly, a measurement of a length of the second object portion 502b of the laser stripe 502 provides a measurement of a width dimension $X_2$ of the second object 110b. The length of a portion of the laser stripe 502, such as the first object portion 502a or the second object portion 502b, can be determined, for example, by identifying a horizontal deviation (or horizontal offset) from the optical center 328 (see FIGS. 6B-6C below) of the ends of the first object portion 502a of the laser stripe 502 and converting the respective horizontal deviations into physical coordinates and/or measurements from the optical center 328.

FIG. 5B is a representation of a view of the objects 110a, 110b as viewed through the camera 304, or of a second image 500b captured by the camera 304 of the object measurement system 300 with the laser plane 316 off or deactivated, according to one embodiment. The second image 500b can be subtracted from the first image 500a to yield a high contrast image. The second image 500b, or ambient light image 500b, may be captured close enough in time to capture of the first image 500a to reduce and/or eliminate any movement of the objects 110a, 110b (between the images 500a, 500b) that may cause motion artifacts (e.g., incomplete cancellation of the background or ambient image) within a high contrast image, such as high contrast image 500c of FIG. 5C, generated from the images 500a, 500b.

Figure 5C:
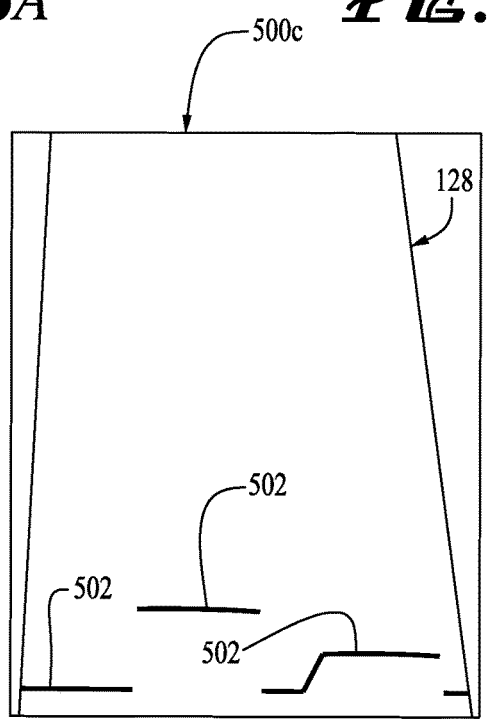
FIG. 5C is a representation of image data resulting from subtracting an image captured of the view of FIG. 5B from an image captured of the view of FIG. 5A, according to one embodiment.

FIG. 5C is a representation of a high contrast image 500c generated by subtracting the second image 500b from the first image 500a. The high contrast image 500c more clearly shows the laser stripe 502. The background or ambient image data may be removed leaving the laser stripe 502 more pronounced in the image 500c. The high contrast image 500c may be processed more easily than, for example, the first image 500a to determine dimension measurements.

Processing the image data may include thresholding, for example, a high contrast image such as image 500c, to obtain a binary image. The thresholding classifies each pixel in the image as belonging to the background (e.g., background pixel=0) or to the laser stripe 502 (e.g., laser stripe pixel=1). For example, the thresholding may be accomplished according to a formula: BinarizedPixel=Grayscale Pixel>Threshold. The resulting binary image may be processed column-by-column to determine the row which contains the laser stripe 502 (e.g., BinarizedPixel=1) in the binary image. The thickness of the laser stripe 502 in the binary image may yield multiple sequential rows of laser line pixels. The middle row of these pixels may be considered as the location of the laser line in a particular column of the binary image.

Other methods of processing image data (e.g., a high contrast image) and/or determining a location of the laser stripe 502 within image data may be employed.

FIGS. 6A-6D are front views of the FOV 330 of the camera 304 of the object measurement system 300 of FIGS. 3A-3C, according to one embodiment. FIGS. 6A-6C, specifically, are front views of the FOV 330 of the object measurement system 300 illustrating a pattern or fan of rays 602 to the camera 304 of the object measurement system 300 of FIG. 3. Although individual rays are shown in FIGS. 6A-6C, it should be appreciated that the fan of rays 602 may be nearly continuous, thereby forming the laser plane 316. In FIG. 6A, a first ray 611 may correspond to a first end 620 of the first object portion 502a of the laser stripe 502 (see FIG. 5), which is generated where the laser plane 316 (see FIGS. 3B, 4A-4D) strikes the first object 110a. A second ray 612 may correspond to a second end 622 of the first object portion 502a of the laser stripe 502 (see FIG. 5). Similarly, a third ray 613 may correspond to a first end 624 of the second object portion 502b of the laser stripe 502, which is generated where the laser plane 316 strikes the second object 110b. A fourth ray 614 may correspond to a second end 626 of the second object portion 502b of the laser stripe 502.

FIGS. 6B and 6C illustrate similar triangles from which a width measurement X can be determined, such as width measurements $X_1$ and $X_2$ of the first object 110a and second object 110b, respectively. Assuming the position of the optical center is known, a captured image, such as image 500a of FIG. 5A or image 500c of FIG. 5C, can be processed to determine a horizontal pixel deviation in number of pixels $d_x$. Then the similar triangles depicted in FIGS. 6B and 6C can be used to determine horizontal physical coordinates $X_{phy}$, which coordinates can then be used to determine a width measurement X.

For example, FIG. 6B illustrates a determination of a horizontal physical coordinate $X_{phy1}$ of the first end 624 of the second object portion 502b relative to the camera aim 326 (or optical axis) of the camera 304 (see FIGS. 3B and 3C). The first end 624, as viewed or captured by the imager 320 through the imager lens 322 may be horizontally deviated or offset from the optical center 328 by a horizontal pixel deviation of $d_{x1}$ pixels. The size of this horizontal deviation can be determined by multiplying the horizontal pixel deviation $d_{x1}$ by the size of the individual pixels p (e.g., as measured in meters, millimeters, or the like). Using the horizontal pixel deviation $d_{x1}$ and pixel size p, a coordinate $X_{phy1}$ of the second end 326 can be determined using the following equation:

$$X_{phy} = (Z_0 - Z)\frac{d_x p}{f}. \qquad (2)$$

The above equation (2) provides a physical coordinate $X_{phy}$ (or horizontal position relative to the camera aim 326), such as a physical coordinate $X_{phy1}$ of the first end 624 of the second object portion 502b of the laser stripe 502. With another physical coordinate $X_{phy}$, a distance between the two coordinates can be determined.

FIG. 6C illustrates that a similar process and calculation may be performed to determine a physical coordinate $X_{phy2}$ (or horizontal position relative to the camera aim 326) of the second end 626 of the second object portion 502b of the laser stripe 502. The coordinate $X_{phy1}$ of the first end 624 and coordinate $X_{phy2}$ of the second end 626 can then be used to determine a measurement of a length of the second object portion 502b and, thus, a measurement of the width $X_2$ of the second object 110b. For example, a distance between two physical coordinates $X_{phy}$ can be calculated with an equation:

$$X = |X_{phy1} - X_{phy2}| \qquad (3),$$

where $X_{phy1}$ is a first coordinate and $X_{phy2}$ is a second coordinate and X is the absolute value of a difference between $X_{phy1}$ and $X_{phy2}$. The first coordinate $X_{phy1}$ may be the coordinate of a left end (with respect to the captured image 500) of an object portion of a laser stripe, such as first end 624 of the second object portion 502b (or a first end 620 of the first object portion 502a) and the second coordinate $X_{phy2}$ may be a coordinate of a right end (with respect to the captured image 500) of an object portion of a laser stripe, such as second end 622 of the first object portion 502a and second end 626 of the second object portion.

As can be appreciated, a similar process and/or calculation can be performed to determine the width $X_1$ of the first object 110a.

FIG. 6D is a front view of the FOV of the camera of the object measurement system 300 illustrating shadow regions 650a, 650b, 650c, according to one embodiment. The rays 602 of the illustrated laser plane 316 diverge from a single point (e.g., the diverging lens 314 shown in FIG. 3A), which may create shadow regions 650a, 650b, 650c where a height and/or width measurement may not be obtainable. The object measurement system 300 (see FIGS. 3A-3C) may include a lateral item sensor light curtain (LAT) (not shown), which may compensate for shadow regions of a laser rangefinder 301 of the object measurement system 300.

The LAT data may be defined at a small number of points (e.g., 31) across the transport mechanism 128, whereas the laser range finder 301 may have many more columns in the image (or points across the transport mechanism 128) where range may be measured. The rays 602 may be "binned" by averaging the height of the nearest equally spaced location to match the LAT. Binning the rays 602 may allow data from the laser range finder 301 (see FIGS. 3A-3C) to be more easily matched to data from the LAT. In other words, the binning may be performed by the laser rangefinder 301 (or on the data of the laser range finder 301) to bring the coordinate data from the laser rangefinder 301 into the same coordinate system as the LAT. Given a list of (X,Z) coordinates from the laser rangefinder 301, and a list of X coordinate centers (e.g. 31) of the LAT detectors $X_0$-$X_N$, binning determines the mean value of Z from the rangefinder coordinate list of all points having X coordinates that are between $X_i$ and $X_{i+1}$, where i=1 to N−1.

Figures 7A, 7B:
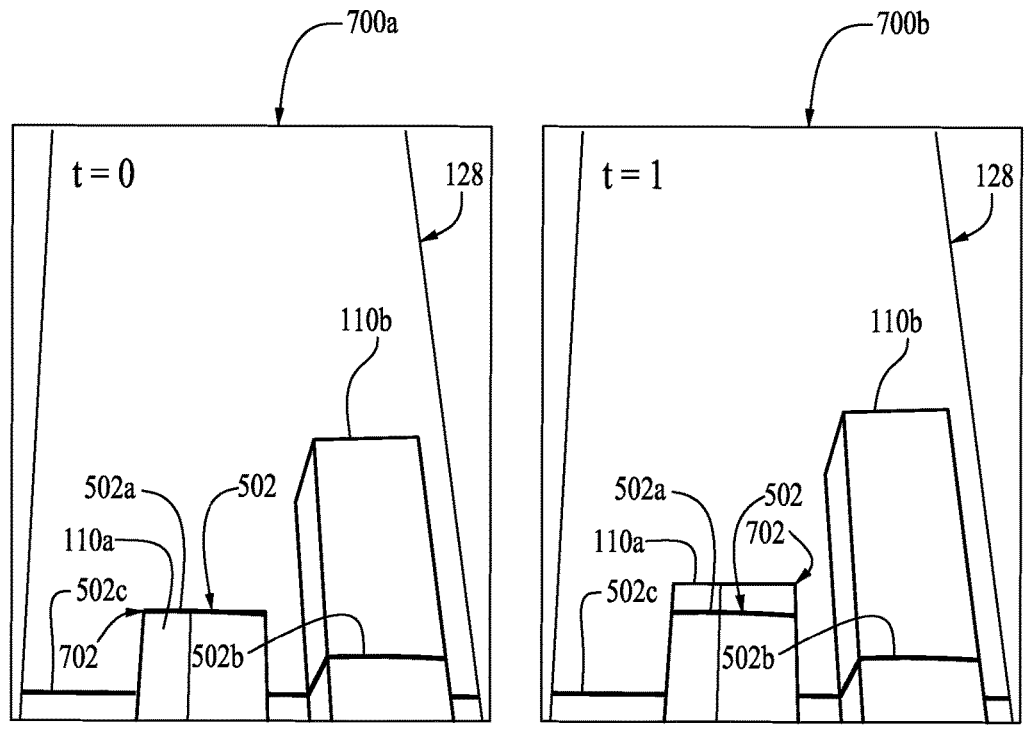
FIGS. 7A-7C are representations of images of objects as viewed through, or captured by, a camera of an object measurement system, according to one embodiment, and that depict how a length measurement can be determined.
Figure 7C:
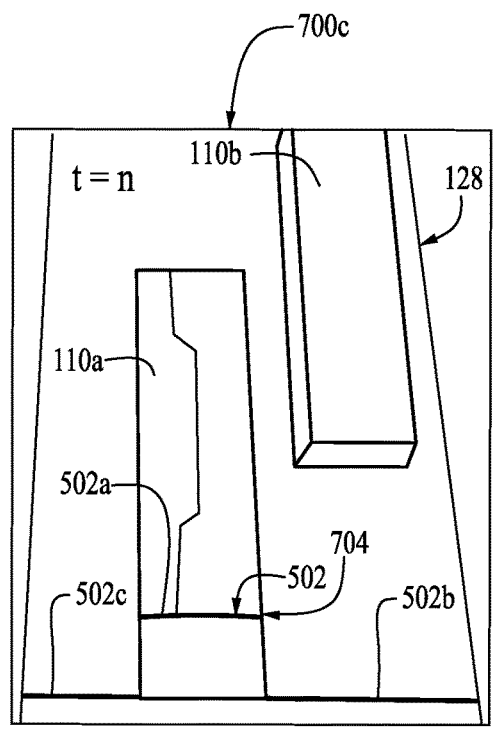

FIGS. 7A-7C are representations of images 700a, 700b, 700c of an object 110a as viewed through, or captured by, a camera 304 of an object measurement system 300 (see FIGS. 3A-3C), according to one embodiment. The images 700a, 700b, 700c illustrate determination of a length measurement Y of the object 110a. The image 700a of FIG. 7A is frame N=0 captured at a point in time (time t=0, for ease of description) when the laser plane 316 (see FIGS. 3A-3C) is barely intersecting the object 110a and a first object portion 502a of the laser stripe 502 appears at a leading edge 702 of the object 110a.

The image 700b of FIG. 7B is frame n=1 captured at a point in time after t=0 (e.g., time t=1/F). The camera 304 (see FIGS. 3A-3C) may take pictures at a frame rate F (frames/second) and the image 700b of FIG. 7B is a next captured frame at the frame rate F. Thus, the image 700b is captured at a different point in time (time t=1/F) from the image 700a of FIG. 7A. If the transport mechanism 128 (e.g., a conveyor belt) moves at a velocity V (m/s), then the object 110a may be understood as moving in the scanning direction according to a formula:

$$\Delta Y = V/F \qquad (4).$$

Thus, the object 110a moves a distance ΔY between each frame and is captured in image 700b as having moved the distance ΔY.

The image 700c of FIG. 7C is frame n=N captured at a point in time (e.g., time t=N/F) when the laser plane 316 (see FIGS. 3A-3C) is barely intersecting the object 110a and a first object portion 502a of the laser stripe 502 appears at a trailing edge 704 of the object 110a. The object 110a is captured in image 700c as having moved the distance ΔY*N.

The laser plane 316 points straight down, or approximately straight down, such that the location of the intersection 342 (see FIG. 3B) of the laser plane 316 with the object 110a along a length Y of the object 110a is independent of a height Z of the object. If it is assumed that a coordinate system is based with the center of the laser line at (0,0,0), i.e., Y=0, and assumed that the first image 700a (i.e., frame number n=0) is taken at time t=0, then a measurement of the length Y can be calculated according to a formula:

$$Y = \Delta Y * N \qquad (5),$$

or according to a formula:

$$Y = V/F * N \qquad (6).$$

In other words, the length Y of an object can be determined using N as the number of frames captured by the camera that include the object 110a being measured and the position of the laser stripe deviated from the base position. The number of frames N captured by the camera that include the object 110a being measured and the position of the laser stripe deviated from the base position divided by the frame rate F is equal to the time period during which the position of the laser stripe is on the object 110a and deviated from the base position. That time period multiplied by the velocity V of the transport mechanism results in a distance, or length Y of the object 110a.

A length Y of other objects, such as object 110b (see FIGS. 3B, 4A-4D, 5, and 6A-6D) can then be similarly calculated.

Figure 8:
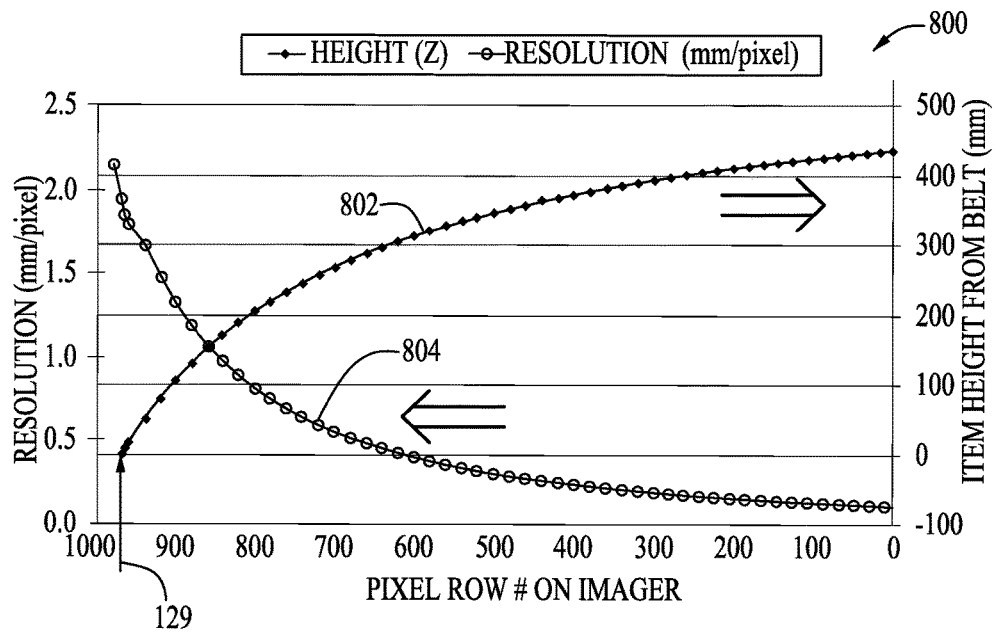
FIG. 8 is graph plotting a height vs. pixel row and resolution vs. pixel row, to indicate where (e.g., the pixel row) in an image a laser stripe appears that is generated by a laser plane generator on an object at a given height, and to indicate the resolution that can be provided at a given pixel row in the image, according to one embodiment.

FIG. 8 is graph 800 plotting height vs. pixel row and resolution vs. pixel row, according to one embodiment of an object measurement system, such as the object measurement system 300 of FIGS. 3A-3C. The graph 800 illustrates a location (i.e., the pixel row) where a laser stripe (on an object of a given height) appears within an image captured by an imager of the object measurement system. The graph 800 also illustrates the object depth resolution that can be provided at a given pixel row in the image captured by the imager of the object measurement system by measuring the height of the laser line in the image to the nearest row. The images captured by the object measurement system corresponding to FIG. 8 may include approximately 1000 pixel rows (e.g., pixel row 1000 is a last pixel row of the captured image and pixel row 1 is the first pixel row of the captured image). The top of the image corresponds to lower pixel row numbers and to taller objects and the bottom of the image corresponds to higher pixel row numbers and to shorter objects (or the transport mechanism 128 and/or transport plane 129).

A height plot line 802 in the graph 800 corresponds to a vertical axis of the graph 800 on the right side of the graph 800, which provides height from the belt in millimeters (mm). The height plot line 802 illustrates that the object measurement system corresponding to the data of graph 800 in FIG. 8 can measure objects from 0 mm to about 434 mm above a transport plane 129. The height plot line 802 illustrates that objects having a height near or above 400 mm have a laser stripe produced thereon that appears in the image in a pixel row between row 0 and about row 300. The height plot line 802 also illustrates that shorter objects, having a height between 0 mm and 200 mm have a laser stripe produced thereon that appears in the image in a pixel row between about row 800 and about row 970. Accordingly, near the bottom of a captured image, the vertical distance (i.e., a portion of a height measurement) that is measured with each pixel row is greater than the vertical distance that is measured with each pixel row near the top of the captured image. About 300 pixel rows at the top of the image represent (and are used to measure) heights of objects between a span of approximately 50 mm as compared to about 200 pixel rows at the bottom of the image that represent (and are used to measure) heights of objects between a span of approximately 200 mm. Thus, the accuracy of height measurements improves as the height of an object approaches a maximum height (e.g., approximately 434 mm in the embodiment corresponding to FIG. 9), while the accuracy of height measurements diminishes as the height approaches the transport plane (0 mm). In other words, the accuracy of measurements increases when the height of the object is at or near a maximum measuring height of the object measurement system at the light plane than at or near a minimum measuring height of the object measurement system.

A resolution plot line 804 in the graph 800 corresponds to a vertical axis of the graph 800 on the left side of the graph 800, which provides object resolution in mm/pixel. The resolution plot line 804 shows that the resolution improves (i.e., the distance represented by each pixel decreases) near the top (at higher rows, or lower row numbers) of the captured image. More specifically, the vertical pixel deviation $d_z$ becomes more pronounced for a smaller amount of distance (e.g., change in height), such that at higher rows (lower row numbers) in the image a vertical pixel deviation $d_z$ of a single row provides a more refined measurement of a height difference. The improved resolution (i.e., lower mm/pixel) as the height of an object is captured closer to the top of an image (i.e., at a lower pixel row number within the image) increases the accuracy of height measurements. Similarly, the diminished resolution (i.e., higher mm/pixel) as the height of an object is captured closer to the bottom of an image (i.e., at a higher pixel row number within the image) decreases the accuracy of height measurements.

Figure 9:
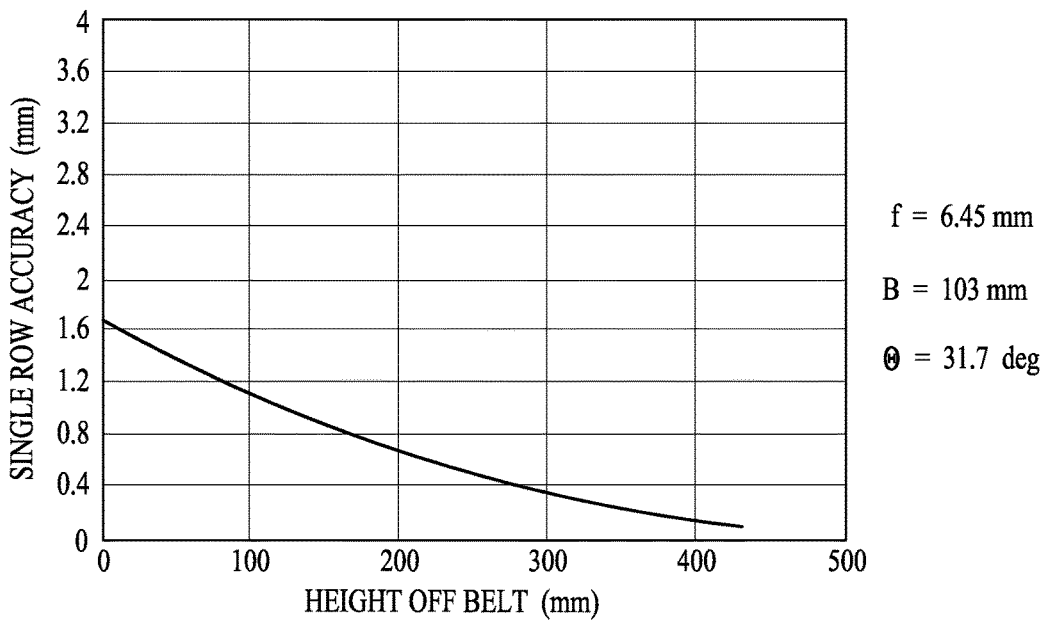
FIG. 9 is a graph plotting a level of single row accuracy vs. height for an object measurement system, according to one embodiment.

FIG. 9 is a graph 900 plotting a level of single row accuracy vs. height off a transport plane for an object measurement system, according to one embodiment. The graph 900 shows that short objects close to the transport plane 129 (object height approximately 0 mm) are measured with worse accuracy than tall objects (e.g., height approaching 400 mm). Stated differently, the object measurement system corresponding to the graph 900 of FIG. 9 measures more accurately closer to the camera 304 (or higher up the laser plane 316) and less accurately farther away from the camera 304 (or lower down the laser plane 316). Improved accuracy near the transport plane 129 can be achieved by providing a second laser plane generator and/or laser plane offset a greater distance from the camera, as will be described below with reference to FIGS. 11, 12A-12D, 13, 14, and 15A-15B.

Figure 10:
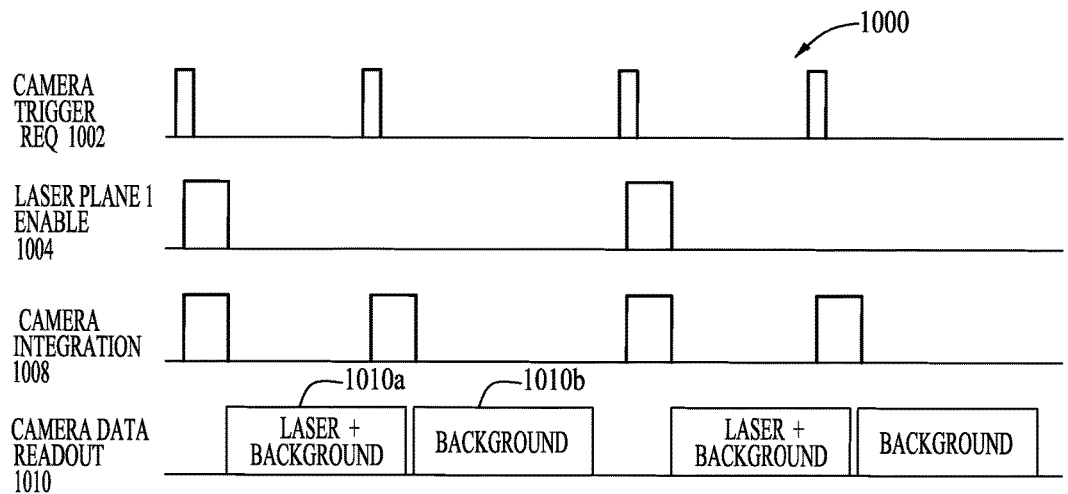
FIG. 10 is a timing diagram of the object measurement system of FIGS. 3A-3B, according to one embodiment.

FIG. 10 is a timing diagram 1000 of the object measurement system 300 of FIGS. 3A-3B, according to one embodiment. A camera trigger request signal 1002 is provided (e.g., the signal 1002 is high), which activates the camera and begins camera integration 1008. A laser plane enable signal 1004 is also provided (e.g., is high) approximately contemporaneous with the camera integration 1008. A camera data readout signals 1010 provide image data (e.g., an image) that is read out of the camera following camera integration, such as through a parallel data interface. A first camera data readout 1010a following camera integration 1008 includes image data with both the laser plane image data (e.g., a laser stripe) and background image data (e.g., the objects, the transport mechanism, etc.). The image data may be a first image, such as the image 500a of FIG. 5A that includes both a laser stripe and background image data.

Following the exposure of the first image, the laser plane enable signal 1004 is removed (e.g., returns low) and the laser plane turns off. With the laser plane turned off, a camera trigger request signal 1002 may again be provided and camera integration 1008 begins again. A second camera data readout 1010b following the camera integration 1008 includes image data with the background (e.g., the objects, the transport mechanism, etc.) and without the laser plane (e.g., without a laser stripe). The image data may be a second image, such as the image 500b of FIG. 5B that includes only background image data.

As noted briefly above with respect to FIG. 5C, a high contrast image (such as image 500c of FIG. 5c) can be generated by subtracting an ambient image (such as image 500b of FIG. 5B having background image data) from an image having both laser plane data and background image data (such as image 500a of FIG. 5A). A high contrast image, such as high contrast image 500c may be processed more easily than, for example, the first image 500a to determine dimension measurements. Furthermore, the intensity of the laser stripe in image 500a may be lower than the intensity of the objects illuminated with ambient light (e.g., the background image), thus preventing the detection of the laser stripe in the image without first performing the background subtraction to yield the high contrast image 500c.

In some embodiments, the camera may be configured to capture multiple images in response to a single camera trigger request signal 1002. For example, the camera may be configured to, in response to a single camera trigger request signal 1002, capture a first image including both laser plane image data and background image data and then capture a second image including simply background image data and without the laser plane image data.

Figure 11:
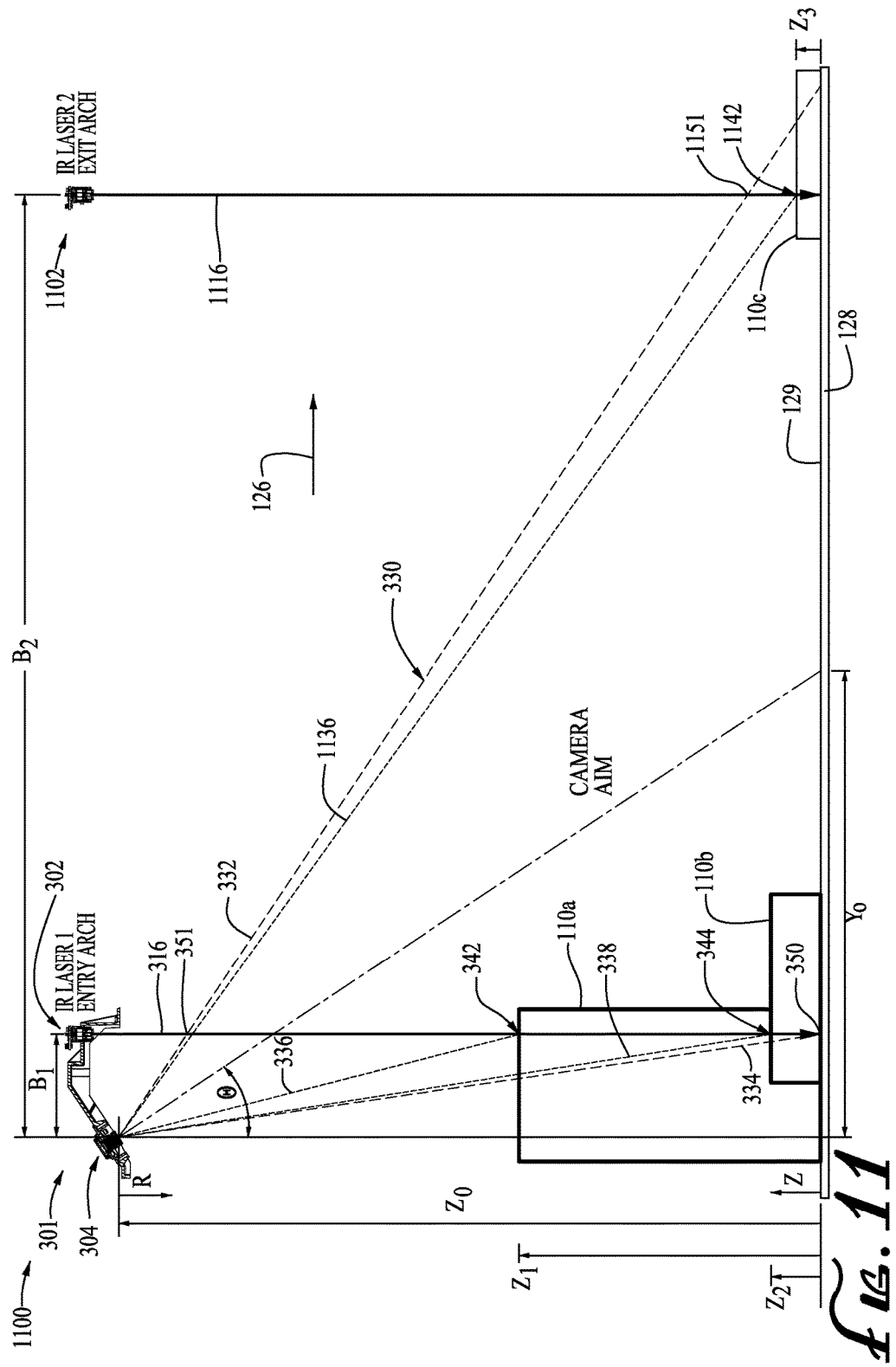
FIG. 11 is a cross-sectional side view of an object measurement system of an automated optical code reading system, according to another embodiment, the object measurement system having two laser plane generators.

FIG. 11 is a cross-sectional side view of an object measurement system 1100 of an automated optical code reading system (e.g., optical code reading system 100 of FIG. 1), according to another embodiment. The object measurement system 1100 may comprise lateral height sensor (LHS) implemented by the laser range finder 301 described above with reference to FIGS. 3A-3C. The object measurement system 1100 may include a camera 304, a light plane generator 302, such as a first laser plane generator 302, and a second light plane generator 1102, such as a second laser plane generator 1102. The first laser plane generator 302 and the camera 304 may be similar to, or identical to, the first laser plane generator 302 and the camera 304 described above, with particular reference to FIGS. 3A-3C, and may operate similarly or even identically. As can be appreciated, in other embodiments, the object measurement system 1100 may include a first light plane generator and camera that may be different from the first laser plane generator 302 and the camera 304 described above.

The first laser plane generator 302 may be configured to generate a laser plane 316 (referred to as a first laser plane 316 in the description of the object measurement system 1100 of FIG. 11) through which objects 110a, 110b, 110c (collectively 110) pass as they are transported on a transport mechanism 128. Similarly, the second laser plane generator 1102 may be configured to generate a second laser plane 1116 through which the objects 110a, 110b, 110c pass as they are transported on the transport mechanism 128. The camera 304 may be operative to capture image data of the objects 110 and of (i) the first laser plane 316 and/or a first laser stripe 502 (see FIG. 12B) that is generated where the first laser plane 316 intersects (or strikes) an object 110 and/or the transport mechanism 128 and/or of (ii) the second laser plane 1116 and/or a second laser stripe 1202 (see FIG. 12B) that is generated where the second laser plane 1116 intersects (or strikes) an object 110 or the transport mechanism 128.

The first laser plane generator 302 may include an infrared (IR) laser 310 (or any suitable light source), a focusing lens 312, and a diverging lens 314 (e.g., a Powell lens) and may operate as described above directing a laser plane 316 vertically downward from the front arch section 104 (FIGS. 1 and 4A) onto the transport mechanism 128.

The second laser plane generator 1102 also may include an infrared (IR) laser 1110 (or any suitable light source), a focusing lens 1112, and a diverging lens 1114 (e.g., a Powell lens), similar to the IR laser 310, the focusing lens 312, and a diverging lens 314 of the laser plane generator 302 of FIG. 3A. The first laser plane generator 302 and the second laser plane generator 1102 may use the same or different wavelengths of light. The second laser plane generator 1102 may be disposed in the rear arch section 106 (FIGS. 1 and 4A). The second laser plane generator 1102 may generate and direct a second laser plane 1116 vertically downward onto the transport mechanism 128 normal (perpendicular) to or approximately normal to the transport plane 129. More specifically, the IR laser and focusing lens of the second laser plane generator 1102 may direct a beam of infrared light downward and the diverging lens diverges or fans the beam to generate the second laser plane 1116 across the transport mechanism 128, similar to the first laser plane 316 generated by the first laser plane generator 302 (as illustrated in FIGS. 4A-4D). The second laser plane 1116 may be parallel, or approximately parallel, to the first laser plane 316.

In other embodiments, the laser plane generators 302, 1102 may be light plane generators that generate first and second light planes. The light plane generators may generate the light planes without use of a laser.

The camera 304, as described above, may include an imager 320 and an imager lens 322. The camera may have a focal length f. The camera 304 may further include an IR filter 324 (or other suitable filter). The camera 304 may be offset a distance $B_1$ from the first laser plane generator 302 and offset a distance $B_2$ from the second laser plane generator. The offset distances $B_1$, $B_2$ may be distances that the camera 304 is offset from the respective laser plane generators 302, 1102 in a direction opposite the scanning direction 126.

The FOV 330 of the camera 304 and/or the camera aim 326 (or optical axis of the camera 304) may be directed downward toward the transport mechanism 128 and at an angle θ toward the first laser plane 316 and the second laser plane 1116. The angle θ may be a vergence angle between the camera optical axis 326 and the optical axis of the laser 310 or the laser 1110. In the illustrated embodiment of FIG. 11, because the laser 310 (see FIG. 3A) of the first laser plane generator 302 and the laser of the second laser plane generator 1102 may be directed straight down and parallel to one another, the angle θ may be an angle between the camera aim 326 and vertical.

As described above, the first edge 332 of the camera FOV 330 may capture (and/or intersect) the first laser plane 316 at a point 351 (e.g., a first near field extreme) above the transport plane 129. The first edge 332 of the camera FOV 330 may also capture and/or intersect the second laser plane 1116 at a point 1151 (e.g., a second near field extreme) above the transport plane 129, although closer to the transport plane 129 than the point 351 due to the downward direction (and/or angle) of the camera aim 326 and greater offset distance $B_2$ from the second laser plane generator 1102. As before, the second edge 334 of the camera FOV 330 may capture (and/or intersect) the point 350 (e.g., a far field extreme) where the laser plane 316 and the transport mechanism 128 and/or the transport plane 129 intersect. The camera 304 may be configured to capture image data of the first laser plane 316 and/or the second laser plane 1116 and/or of objects 110 as they pass through the laser planes 316, 1116.

As shown in FIG. 11, the first laser plane generator 302 and the camera 304 are disposed above the transport mechanism 128 and/or transport plane 129, such as within the front arch section 104. In particular, as described above, the camera 304 is positioned above the transport plane 129 a distance $Z_0$. The range R of the camera 304 is measured or referred to as the direction from the camera 304 vertically downward toward the transport mechanism while a height of the objects 110 is measured vertically upward from the transport plane 129. The second laser plane generator 1102 is similarly disposed above the transport mechanism 128 and/or transport plane 129, such as within the rear arch section 106.

Figure 12A:
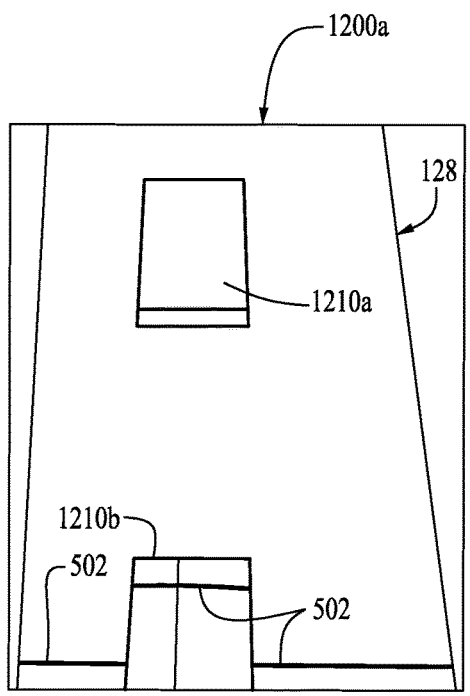
FIG. 12A is a representation of an image captured by the camera of the object measurement system of FIG. 11, with a first laser plane on, according to one embodiment.

In FIG. 11, two side-by-side objects 110a, 110b are shown within the FOV 330 and below the first laser plane generator 302 and intersecting the first laser plane 316 and a third object 110c is within the FOV 330 and below the second laser plane generator 1102 and intersecting the second laser plane 1116. The first laser plane 316 strikes the objects 110a, 110b. At the intersections 342, 344 where the first laser plane 316 strikes the respective objects 110a, 110b, an infrared laser stripe 502 (see FIG. 12A) is generated on the top of the objects 110a, 110b. The intersections 342, 344 are viewed (or the view of the intersections 342, 344 is captured) with the imager 320 of the camera 304. The offset distance $B_1$ causes the position of the laser stripe 502 in the camera FOV 330 (and accordingly in an image captured by the camera 304) to depend on a height of the surface (e.g., object 110, transport plane) on which the laser stripe 502 is generated, as shown in FIG. 12A and described in greater detail below with reference to the same. The height of the objects 110a, 110b can be determined using triangulation, as described above. More specifically, as described above with reference to FIGS. 3B and 3C, a vertical pixel deviation of $d_z$ can be determined. The size of a vertical deviation can be determined by multiplying the vertical pixel deviation $d_z$ by the size of the individual pixels p (e.g., as measured in meters, millimeters, or the like). Using the vertical pixel deviation $d_z$ and pixel size p, the height Z of an object 110a, 110b, 110c can then be determined using the equation (1) for height Z, as provided above and reproduced here:

$$Z = Z_0 - \frac{B}{\tan\left(\theta + \tan^{-1}\left(\frac{d_z p}{f}\right)\right)}, \quad (1)$$

where B is $B_1$ for objects 110a, 110b because the first laser plane 316 is striking these objects 110a, 110b.

As mentioned above, a third object 110c is shown in FIG. 11 within the FOV 330 and below the second laser plane generator 1102 and intersecting the second laser plane 1116. The second laser plane 1116 strikes the object 110c. At the intersection 1142 where the second laser plane 1116 strikes the object 110c, an infrared laser stripe 1202 (see FIG. 12A) is generated on top of the object 110c. A view of the intersection 1142 is captured by the imager 320 of the camera 304. A vertical pixel deviation of $d_z$ can also be determined for the point (or pixel or pixel row) where the second laser plane 1116 strikes the object 110c. This pixel deviation and $B_2$ can be used in the equation (1) above. In other words, the equation (1) above can be used to calculate a height measurement using image data including the laser stripe generated by the first laser plane 316 or the second laser plane 1116, using $B_1$ or $B_2$, depending on which laser plane 316, 1116 is striking the object 110a, 110b, 110c being measured.

The difference between $B_1$ and $B_2$ enables different measurement capabilities (or qualities) through the first laser plane 316 and the second laser plane 1116. In particular, the shorter offset distance $B_1$ of the first laser plane generator 302 provides a wider dynamic range of object measurement but with lower resolution and the longer offset distance $B_2$ of the second laser plane generator 1102 provides a more narrow dynamic range of object measurement but with higher resolution. Accordingly, taller objects 110 can be measured at the first laser plane 316 and thin or short objects 110 can be measured with improved height resolution at the second laser plane 1116.

As can be appreciated, the equations (2) through (6), as provided above, can also be used in conjunction with the second laser plane 1116 to determine a width X dimension and a length Y dimension, as described above.

FIGS. 12A-12D illustrate representations of images 1200a, 1200b captured by the camera 304 of the object measurement system 1100 of FIG. 11 and of high contrast images 1200c, 1200d that can be generated by taking the differences between the capture images 1200a, 1200b. FIG. 12A is a representation of an image 1200a captured by the camera 304 of the object measurement system 1100 of FIG. 11, with the first laser plane 316 (see FIG. 11) on or activated. Two objects 1210a, 1210b are being passed through the object measurement system 1100 by the transport mechanism 128. The first laser plane 316 produces a first laser stripe 502 that is visible in the image 1200a of FIG. 12A.

Figure 12B:
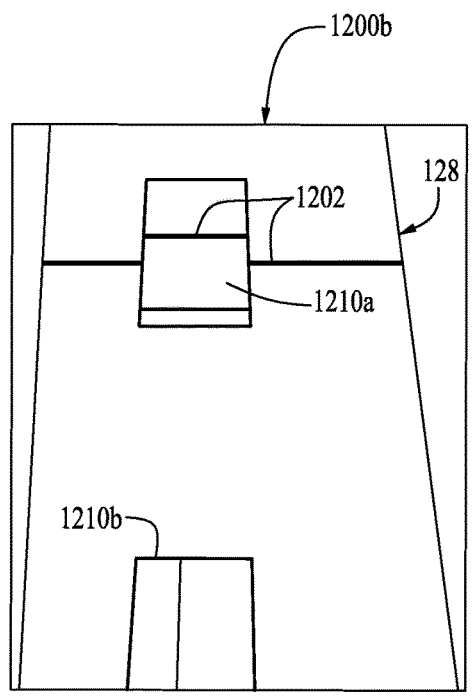
FIG. 12B is a representation of an image captured by the camera of the object measurement system of FIG. 11, with a second laser plane on and the first laser plane off, according to one embodiment.

FIG. 12B is a representation of an image 1200b captured by the camera 304, with the second laser plane 1116 on (or activated) and the first laser plane 316 off, according to one embodiment. The second laser plane 1116 produces a second laser stripe 1202 that is visible in the image 1200b of FIG. 12B. One or more additional, ambient images, captured when both the first and second laser planes 316, 1116 are off, may be captured and used to generate a high contrast image from the captured image 1200a and/or the captured image 1200b, as described above with reference to FIGS. 5A-5C. However, capturing the one or more additional, ambient images expends resources and/or increases image data capture, and thereby reduces efficiency of the operation of the object measurement system 1100. The present inventors have recognized that high contrast images can be generated with only nominal, if any, additional expenditure of resources and data capture and without reduced efficiency of the object measurement system 1100. In particular, high contrast images can be generated by taking differences of the captured images 1200a, 1200b.

Figure 12C:
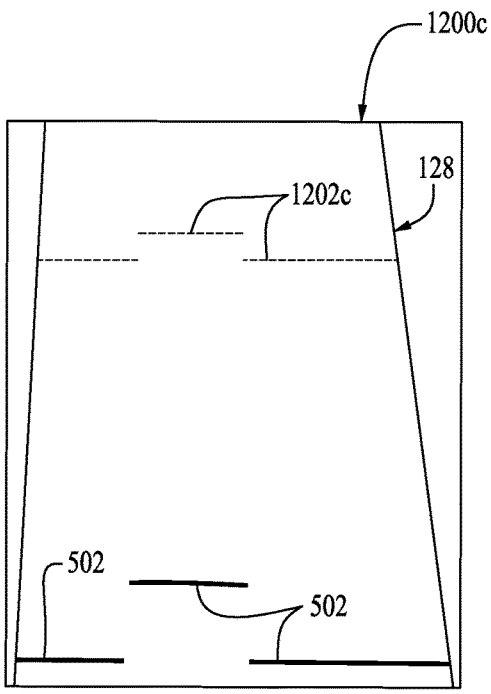
FIG. 12C is a representation of a high contrast image resulting from subtracting the captured image of FIG. 12B from the captured image of FIG. 12A, according to one embodiment.

FIG. 12C is a representation of a high contrast image 1200c that may result from subtracting the second captured image 1200b of FIG. 12B from the first captured image 1200a of FIG. 12A, according to one embodiment. Subtracting the second captured image 1200b from the first captured image 1200a may reduce or eliminate background image data in the resulting high contrast image 1200c. In the case of the present example, image data of the objects 1210a, 1210b and the transport mechanism 128 are reduced and/or eliminated. The second laser stripe 1202 appears in the second captured image 1200b in a location different and away from where the first laser stripe 502 appears in the first captured image 1200a. Accordingly, subtraction of the image data of the second laser stripe 1202 in the second captured image 1200b from the first captured image 1200a does not eliminate the image data of the first laser stripe 502 in the first captured image 1200a. Rather, the subtraction of the image data of the second laser stripe 1202 in the second captured image 1200b from the first captured image 1200a may create an area (or stripe 1202c) in the high contrast image 1200c that is negative (or darker than dark in an actual high contrast image) in the illustrated representation of the high contrast image 1200c). However, because the object measurement system 1100 may seek to identify bright spots (e.g., the bright laser stripe, which is the first laser stripe 502 in the high contrast image 1200c) in an actual high contrast image being processed, using binary thresholding or similar means, the negative area or stripe 1202c does not affect any determination of object dimensions by the object measurement system 1100.

Figure 12D:
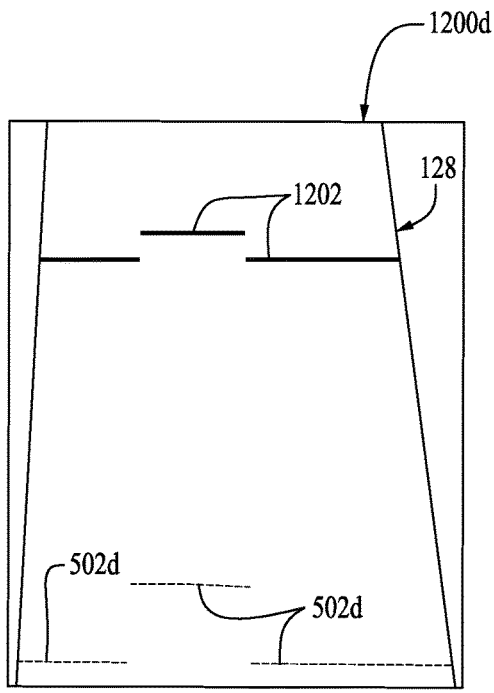
FIG. 12D is a representation of a high contrast image resulting from subtracting the captured image of FIG. 12A from the captured image of FIG. 12B, according to one embodiment.

FIG. 12D is a representation of a high contrast image 1200d that may result from subtracting the first captured image 1200a of FIG. 12A from the second captured image 1200b of FIG. 12B, according to one embodiment. As before, subtracting image 1200a from image 1200b may reduce or eliminate background image data in the resulting high contrast image 1200d. Again, in the present example, image data of the objects 1210a, 1210b and the transport mechanism 128 are reduced and/or eliminated. The second laser stripe 1202 appears in the second captured image 1200b in a location different and away from where the first laser stripe 502 appears in the first captured image 1200a. Accordingly, subtraction of the image data of the first laser stripe 502 in the first captured image 1200a from the second captured image 1200b does not eliminate the image data of the second laser stripe 1202 in the second captured image 1200b. Rather, the subtraction of the image data of the first laser stripe 502 in the first captured image 1200a from the second captured image 1200b may create an area (or stripe 502d) in the high contrast image 1200d that is negative (or darker than dark in an actual high contrast image, or lighter than light in the illustrated representation of the high contrast image 1200d). However, because the object measurement system 1100 may seek to identify bright spots (e.g., the bright laser stripe, which is the second laser stripe 1202 in the high contrast image 1200d) using binary thresholding or similar means, the negative area or stripe 502d does not affect any determination of object dimensions by the object measurement system 1100.

Figure 15A:
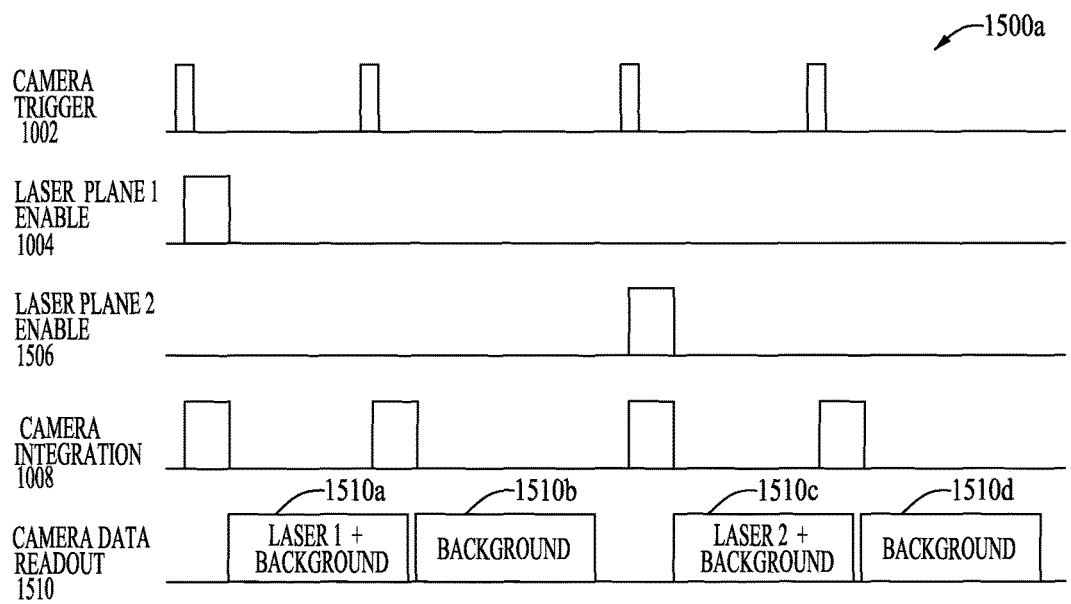
FIG. 15A is a timing diagram of the object measurement system of FIG. 11, according to one embodiment.
Figure 15B:
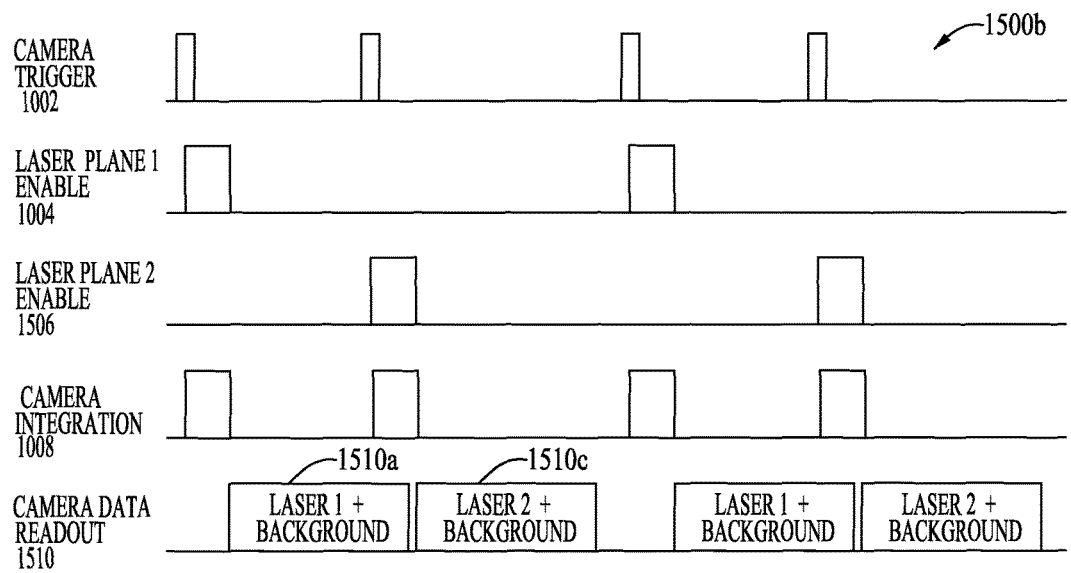
FIG. 15B is a timing diagram of the object measurement system of FIG. 11, according to another embodiment.

By using the second captured image 1200b as an ambient (or background) image for creating a high contrast image 1200c from the first captured image 1200a, and by using the first captured image 1200a as an ambient (or background) image for creating a high contrast image 1200d from the second captured image 1200b, a similar general amount of image data is being captured and a similar number of images are being captured in a similar amount of time and using a similar amount of resources. Accordingly, addition of the second laser plane generator 1102 to the object measurement system 1100 increases accuracy of measurement of shorter objects with nominal increase in processing and data capture resources. Further discussion of the timing and efficiency of the methodology is illustrated in FIGS. 15A and 15B and discussed below with reference to the same.

Figure 13:
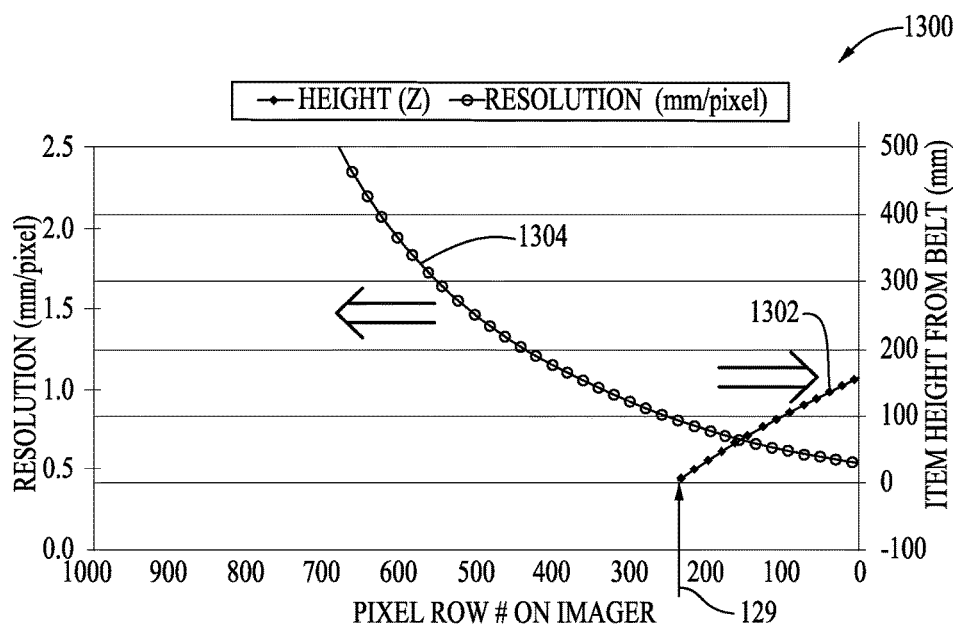
FIG. 13 is a graph plotting height vs. pixel row and resolution vs. pixel row, to illustrate where (e.g., the pixel row) in an image a laser stripe appears that is generated by a second laser plane generator on an object at a given height, and to illustrate the resolution provided at a given pixel row in the image, according to one embodiment.

FIG. 13 is graph 1300 plotting height vs. pixel row and object height resolution vs. pixel row, according to one embodiment of an object measurement system, such as the object measurement system 1100 of FIG. 11. The graph 1300 illustrates a location (e.g., the pixel row) where a second laser stripe 1202 (see FIG. 12) (on an object of a given height) appears within an image captured by an imager of the object measurement system. The graph 1300 also illustrates the resolution that can be provided at a given pixel row in the image captured by the imager of the object measurement system, assuming the laser stripe location is measured to the nearest row. The images captured by the by the object measurement system corresponding to FIG. 13 may include approximately 1000 pixel rows (e.g., pixel row 1000 is a last pixel row of the captured image and pixel row 0 or 1 is the first pixel row of the captured image). The top of the image corresponds to lower pixel row numbers and to taller objects and the bottom of the image corresponds to higher pixel row numbers and to shorter objects (or the belt surface). A difference of the position of the transport plane 129 in graphs 800 and graph 1300 reflects the difference between offset distance $B_1$ and offset distance $B_2$ (see FIG. 11).

A height plot line 1302 in the graph 1300 corresponds to a vertical axis of the graph 1300 on the right side of the graph 1300, which provides height from the belt in millimeters. The height plot line 1302 illustrates that the object measurement system corresponding to the data of graph 1300 in FIG. 13 can measure objects at a second laser plane 1116 (see FIG. 11) from a height of 0 mm to about 150 mm above a transport plane. In other words, the second laser plane 1116 may be used to measure a height of objects having a shorter height dimension than can be measured using the first laser plane 316 (see FIG. 11). The height plot line 1302 illustrates that objects having a height at or near 150 mm have a laser stripe produced thereon that appears in the image in a pixel row near the top of the image, close to pixel row 1. The height plot line 1302 also illustrates that shorter objects have a laser stripe produced thereon that appears in the image in a pixel row near approximately row 200.

A resolution plot line 1304 in the graph 1300 corresponds to a vertical axis of the graph 1300 on the left side of the graph 1300, which provides object resolution in mm/pixel. The resolution plot line 1304 shows that the resolution is fairly constant, although gradually improving, over the height measurement range (from the transport plane 129 to a maximum height, e.g., about 156 mm). The vertical pixel deviation $d_z$ resulting from the second laser plane generator 1102 is more pronounced over the height range 0 mm to 156 mm than the vertical pixel deviation $d_z$ resulting from the first laser plane generator 302. A comparison of the graph 1300 of FIG. 13 with the graph 800 of FIG. 8 illustrates the improved resolution at lower heights.

Figure 14:
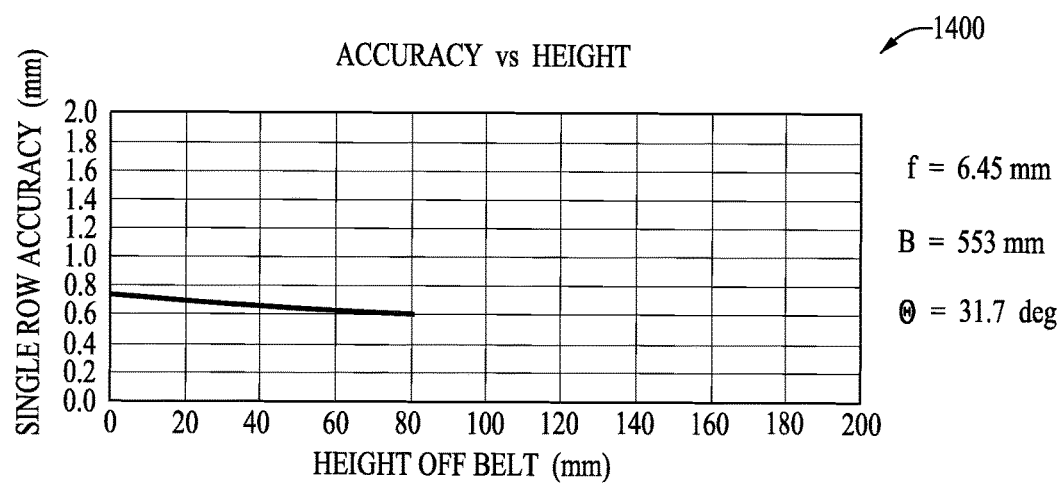
FIG. 14 is a graph plotting a level of single row accuracy vs. height at a second laser plane in the object measurement system of FIG. 11, according to one embodiment.

FIG. 14 is a graph 1400 plotting a level of single row accuracy vs. height off a transport plane at a second laser plane 1116 (FIG. 11) in the object measurement system of FIG. 11. A comparison of the graph 1400 of FIG. 14 with the graph 900 of FIG. 9 shows that objects of lower heights (close to the transport plane 129, height approaching 0 mm) are measured with greater accuracy at the second laser plane 1116 than at the first laser plane 316 (FIG. 11). For example, for very short objects, barely off the belt surface 129, the graph 900 of FIG. 9 shows an accuracy of 1.7 mm/pixel, whereas the graph 1400 of FIG. 14 shows an accuracy of about 0.7 mm/pixel, an improvement of accuracy of a factor of about 2.5.

FIG. 15A is a timing diagram 1500a of the object measurement system 1100 of FIG. 11, according to one embodiment. In FIG. 15A, the timing diagram 1500a is closely similar to the timing diagram 1000 of FIG. 10. A laser plane enable signal 1004 (or 1506) is activated and image data of the laser plane and the background 1510a is captured. Then the laser plane enable signal 1004 (or 1506) is turned off and image data of just the background 1510b is captured. A difference is that during the first cycle, the first laser plane is enabled 1004 and during the second cycle the second laser plane is enabled 1506. The timing diagram 1500a illustrates alternating image capture cycles between capturing image data of the first laser plane and the second laser plane, with each image capture cycle including capture of an ambient image (e.g., a background only image).

More specifically, a camera trigger request signal 1002 is provided (e.g., is high), which activates the camera and begins camera integration 1008. A first laser plane enable signal 1004 is also provided (e.g., is high) approximately contemporaneous with and through camera integration 1008 such that the first laser plane is activated throughout camera integration 1008. A camera data readout signal 1510 provides image data (e.g., an image) read out of the camera following camera integration. A first camera data readout 1510a following camera integration 1008 includes image data with both the first laser plane (e.g., a first laser stripe)

and background (e.g., the objects, the transport mechanism, etc.). The image data may be a first image that includes both the first laser stripe 502 and background image data (similar to the image 1200*a* of FIG. 12A).

The laser plane enable signal 1004 is removed (e.g., returns low) and the laser plane turns off. With the laser plane turned off, a camera trigger request signal 1002 may again be provided and camera integration 1008 begins again. A second camera data readout 1510*b* following the camera integration 1008 includes image data with the background (e.g., the objects, the transport mechanism, etc.) and without the first laser plane (e.g., without the first laser stripe). In the embodiment of FIG. 15A, the second camera data readout 1510*b* is also without the second laser plane. The image data may be a second image that includes only background image data.

As noted briefly above, a high contrast image can be generated by subtracting the ambient image (e.g., the second image having only background image data without the laser plane image data) from an image such as the first image (e.g., image 1200*a* of FIG. 12A having both laser plane image data and background image data). The high contrast image may be processed more easily than, for example, the first image to determine dimension measurements.

In FIG. 15A, the cycle is repeated, except that a second laser plane enable signal 1506 is provided (e.g., is high) approximately contemporaneous with and through camera integration 1008 such that the second laser plane is activated throughout camera integration 1008, and the first laser plane enable signal 1004 is not provided. A camera data readout signal 1510 provides image data (e.g., an image) read out of the camera following camera integration. A third camera data readout 1510*c* following camera integration 1008 includes image data with both the second laser plane (e.g., a second laser stripe) and background (e.g., the objects, the transport mechanism, etc.). The image data may be a third image that includes both the second laser stripe 1102 and background image data (similar to the image 1200*b* of FIG. 12B).

The second laser plane enable signal 1506 is removed (e.g., returns low) and the laser plane turns off. With the laser plane turned off, a camera trigger request signal 1002 may again be provided and camera integration 1008 begins again. A fourth camera data readout 1510*d* following the camera integration 1008 includes image data with the background (e.g., the objects, the transport mechanism, etc.) and without the second laser plane (e.g., without the second laser stripe). In the embodiment of FIG. 15A, the fourth camera data readout 1510*d* is also without the first laser plane. The image data may be a fourth image that includes only background image data.

A high contrast image of the second laser stripe can be generated by subtracting the ambient image (e.g., the fourth image having only background image data without the laser plane image data) from an image such as the third image (e.g., image 1200*b* of FIG. 12B having both second laser plane image data and background image data). The high contrast image may be processed more easily than, for example, the third image to determine dimension measurements of an object at the second laser plane.

As can be appreciated, the methodology of alternating image capture cycles between the first laser plane generator and the second laser plane generator either significantly reduces (by about half) the amount of image data captured at the first laser plane, thereby reducing efficiency, or requires faster image capture and significantly increases the demands on the resources. The present inventors have recognized that shortcomings of this methodology may be addressed, for example, by using an image capture including image data of the second laser plane (e.g., the second laser stripe) as a background image to be subtracted from an image capture including image data of the first laser plane (e.g., the first laser stripe), and vice versa. This methodology is illustrated in FIG. 15B.

FIG. 15B is a timing diagram 1500*b* of the object measurement system of FIG. 11, according to another embodiment. In FIG. 15B, the timing diagram 1500*b* is different from the timing diagram 1500*a* of FIG. 15A in that ambient only images (e.g., background only images) are not captured. Rather, an image capture of an alternate laser plane is used as an ambient image to be subtracted from an image capture including desired laser plane image data. A first laser plane enable signal 1004 is activated and image data of the first laser plane and the background 1510*a* is captured. Then the first laser plane enable signal 1004 is turned off and the second laser plane enable signal 1506 is activated and image data of the second laser plane and the background 1510*c* is captured. The timing diagram 1500*b* illustrates alternating image captures between capturing image data of the first laser plane and image captures of the second laser plane, without capturing an ambient only image (e.g., a background only image).

More specifically, a camera trigger request signal 1002 is provided (e.g., is high), which activates the camera and begins camera integration 1008. A first laser plane enable signal 1004 is also provided (e.g., is high) approximately contemporaneous with the camera integration 1008. A camera data readout signal 1510 provides image data (e.g., an image) read out of the camera following camera integration. A camera data readout 1510*a* following camera integration 1008 includes image data with both the first laser plane (e.g., a first laser stripe) and background (e.g., the objects, the transport mechanism, etc.). The image data may be a first image that includes both the first laser stripe 502 and background image data (similar to the image 1200*a* of FIG. 12A).

The laser plane enable signal 1004 is removed (e.g., returns low) and the laser plane turns off and a second laser plane enable signal 1506 is provided (e.g., is high) approximately contemporaneous with the camera integration 1008. A camera data readout signal 1510 provides image data (e.g., an image) read out of the camera following camera integration. A camera data readout 1510*c* following camera integration 1008 includes image data with both the second laser plane (e.g., a second laser stripe) and background (e.g., the objects, the transport mechanism, etc.). The image data may be a second image that includes both the second laser stripe 1102 and background image data (similar to the image 1200*b* of FIG. 12B).

As described above with reference to FIG. 12C, a high contrast image of the first laser stripe 502, such as the high contrast image 1200*c*, can be generated by subtracting the image data of the camera readout 1510*c* (e.g., the captured image 1200*b* of FIG. 12B) from the image data of the camera readout 1510*a* (e.g., the captured image 1200*a* of FIG. 12A). Similarly, as described above with reference to FIG. 12D, a high contrast image 1200*d* of the second laser stripe 1102, such as the high contrast image 1200*d*, can be generated by subtracting the image data of the camera readout 1510*a* (e.g., the captured image 1200*a* of FIG. 12A) from the image data of the camera readout 1510*c* (e.g., the captured image 1200*b* of FIG. 12B).

By using the second captured image 1200*b* as an ambient (or background) image for creating a high contrast image 1200c from the first captured image 1200a, and by using the first captured image 1200a as an ambient (or background) image for creating a high contrast image 1200d from the second captured image 1200b, a similar amount of image data is being captured and a similar number of images are being captured in a similar amount of time and using a similar amount of resources. As is evident by comparing the graph 1500b of FIG. 15B, to the graph 1500a of FIG. 15A, and by comparing the graph 1500b to the graph 1000 of FIG. 10, the methodology illustrated in FIG. 15B allows the addition of the second laser plane generator 1102 to the object measurement 1100 with nominal increase in processing and data capture resources.

A system for measuring object dimensions in an automated data reader, according to one example, may include a light plane generator and a camera. The light plane generator may be configured to be disposed above a transport mechanism of the automated data reader. The transport mechanism may have a top surface on which objects are placed and transported in a scanning direction through one or more read zones of the automated data reader. The top surface may also define a transport plane. The light plane generator may be operable to project a light plane vertically downward toward the transport mechanism. The light plane may be oriented perpendicular to the transport plane and to the scanning direction. The light plane produces a light stripe where the light plane strikes an object. The camera may be disposed above the transport mechanism and offset from the light plane generator. The camera may include an imager and a lens. The camera may have a field of view (FOV) directed downward toward the transport mechanism and at an angle to the light plane. The camera may be configured to capture image data of an object as the object passes through the light plane. A position of the light stripe within the image data relative to a position of an optical center within the image data may be used to determine a measurement of one or more dimensions of the object.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the invention(s). The scope of the present invention should, therefore, be determined only by the following claims.

What is claimed is:

1. An automated data reading system comprising:
   a data reader configured to identify objects as they pass through one or more read zones of the data reader;
   a transport mechanism to transport the objects placed thereon through one or more read zones of the data reader, the transport mechanism having a top surface on which the objects are placed and transported, the top surface defining a transport plane, wherein the transport mechanism transports the objects in a scanning direction; and
   an object measurement system to measure dimensions of objects that are transported by the transport mechanism through the data reader, the object measurement system comprising:
   a light plane generator disposed above the transport mechanism and operable to project a light plane vertically downward toward the transport mechanism, the light plane projected perpendicular to the transport plane and to the scanning direction, wherein the light plane produces a light stripe where the light plane strikes an object;
   a camera disposed above the transport mechanism and offset from the light plane generator, the camera comprising an imager and a lens and having a field of view (FOV) directed downward toward the transport mechanism and at an angle to the light plane, the camera configured to capture image data of an object as the object passes through the light plane,
   wherein a position of the light stripe within the image data is used to calculate a measurement of one or more dimensions of the object;
   wherein the light plane generator is a first light plane generator, wherein the object measurement system further comprises:
   a second light plane generator disposed above the transport mechanism and operable to project a second light plane vertically downward toward the transport mechanism, the second light plane oriented perpendicular to the transport plane and to the scanning direction and parallel to the light plane of the first light plane generator, wherein the second light plane produces a second light stripe where the second light plane strikes an object,
   wherein the light plane generator is a first light plane generator, wherein the object measurement system further comprises:
   a second light plane generator disposed above the transport mechanism and operable to project a second light plane vertically downward toward the transport mechanism, the second light plane oriented perpendicular to the transport plane and to the scanning direction and parallel to the light plane of the first light plane generator, wherein the second light plane produces a second light stripe where the second light plane strikes an object,
   wherein the camera is configured to capture image data of an object as the object passes through the second light plane, and wherein a position of the second light stripe within the image data is used to determine a measurement of one or more dimensions of the object.

2. The system of claim 1, wherein a maximum measuring height at the first light plane is higher than a maximum measuring height at the second light plane.

3. The system of claim 1, wherein shorter objects are measured with greater accuracy from image data of the second light stripe than from image data of the first light stripe.

4. The system of claim 1, wherein a height dimension of the object is calculated based on a vertical deviation of the position of one of the first light stripe and the second light stripe from a position of an optical center in the image data.

5. The system of claim 4, wherein the measurement of the height dimension Z of the object is:

$$Z = Z_0 - \frac{B}{\tan\left(\theta + \tan^{-1}\left(\frac{d_z p}{f}\right)\right)},$$

wherein Z0 is a height of the camera above the transport mechanism, B is an offset distance in the scanning direction by which the camera is offset from one of the first light plane generator and the second light plane generator, dz is the vertical deviation of the position of the one of the first light stripe and the second light stripe from the position of the optical center as measured in number of pixels of the imager of the camera, p is a size of the pixels, f is a focal length of the camera, and θ is an angle between an optical axis of the camera and the light plane.

6. The system of claim 1, wherein one or more horizontal deviations of the position of one of the light stripe and the second light stripe from the optical center are used to calculate a width dimension of the object.

7. The system of claim 6, wherein calculating the width dimension of the object includes using triangulation based on a determined height dimension of the object.

8. The system of claim 6, wherein the measurement of the width dimension X of the object is calculated by determining a distance between two physical coordinates Xphy, wherein each physical coordinate Xphy is calculated using the equation:

$$X_{phy} = (Z_0 - Z)\frac{d_x p}{f},$$

wherein Z0 is a height of the camera above the transport mechanism, Z is a height of the object/laser stripe above the transport mechanism, dx is the horizontal deviation of the position of an end of the light stripe from the position of the optical center as measured in number of pixels of the imager of the camera, p is a size of the pixels, f is a focal length of the camera.

9. The system of claim 1, wherein a time period during which the position of the light stripe is deviated from a base position and a transport rate are used to calculate a length dimension of the object.

10. The system of claim 9, wherein the measurement of the length dimension Y of the object is:

$$Y = \frac{V}{F} * N,$$

wherein V is the velocity at which the object is moving, F is a frame rate at which the camera takes pictures, and N is a number of frames captured by the camera that include the object and the position of the light stripe deviated from the base position.

11. The system of claim 1, wherein measurement of one or more dimensions of the object comprises measuring a dimension of the object along a single axis.

12. The system of claim 1, wherein measurement of one or more dimensions of the object comprises measuring two dimensions of the object along two transverse axes.

13. The system of claim 1, wherein measurement of one or more dimensions of the object comprises measuring three dimensions of the object along three transverse axes.

14. The system of claim 1, wherein a first edge of the FOV of the camera captures an intersection of the light plane and the transport plane and a second edge of the FOV of the camera intersects the light plane at a point above the transport plane and intersects the second light plane at a lower point above the transport plane.

15. The system of claim 1, wherein the first and second light plane generators each comprise an infrared (IR) laser and a diverging lens, the IR laser and lens being configured to generate a fan of vertical rays from the diverging lens to a plurality of points spaced across the transport plane, the rays disposed in a plane orthogonal to the scanning direction.

16. The system of claim 1, wherein the object measurement system further comprises a processor configured to receive image data captured by the imager of the camera of the object measurement system to calculate the measurement of the one or more dimensions of the object.

17. The system of claim 16, wherein the processor is further configured to:
  compare the measurement of the one or more dimensions of the object to dimension data corresponding to an object successfully identified by a data reader as the object passed through the one or more read zones of the data reader, wherein the comparison determines whether the object has one or more dimensions that correspond to the dimension data associated with the successfully identified object.

18. A method for measuring object dimensions in an automated data reading system having a transport plane on which objects are moved through the data reading system, the method comprising:
  generating a first light plane from a first position above the transport plane of the automated data reading system, the first light plane being generated to project vertically downward toward the transport plane and oriented perpendicular to the transport plane, wherein a first light stripe is produced on an object being moved on the transport plane where the first light plane strikes the object,
  capturing first image data of the object as the object passes through the first light plane, wherein the first image data is captured by a camera from a second position above the transport plane and offset from the first position, the camera having a field of view (FOV) directed downward toward the plane and angled toward the first light plane;
  processing the first image data captured by the camera to determine a position of the first light stripe within the image data,
  determining a deviation of the position of the first light stripe within the first image data,
  calculating one or more dimensions of the object using the deviation;
  generating a second light plane from a third position above the transport plane, wherein the second light plane is generated to project vertically downward toward the transport plane and oriented perpendicular to the transport plane and approximately parallel to the first light plane, wherein a second light stripe is produced on an object being moved on the transport plane where the second light plane strikes the object;
  capturing second image data of the object as the object passes through the second light plane, wherein the second image data is captured by the camera from the second position above the transport plane and offset from the third position, the FOV of the camera directed downward toward the transport plane and angled toward the second light plane;

processing the second image data captured by the camera to determine a position of the second light stripe within the image data;

determining a second deviation of the position of the second light stripe within the second image data; and calculating one or more dimensions of the object using the second deviation.

19. The method of claim 18, further comprising:

subtracting the second image data from the first image data to generate a first high contrast image from the first image data, the first high contrast image including image data of the first light stripe and not including a least a portion of background image data of the first image, wherein processing the first image data comprises processing the first high contrast image.

20. The method of claim 18, further comprising:

subtracting the first image data from the second image data to generate a second high contrast image from the second image data, the second high contrast image including image data of the second light stripe and not including a least a portion of background image data of the second image, wherein processing the second image data comprises processing the second high contrast image.

21. A system for measuring object dimensions in an automated optical code reader, the system comprising:

a first laser plane generator operable to project a first laser plane vertically downward toward a transport plane on which objects are moved through the automated optical code reader, the first laser plane oriented perpendicular to the transport plane, wherein the first laser plane produces a first laser stripe where the first laser plane strikes an object;

a second laser plane generator operable to project a second laser plane vertically downward toward the transport plane, the second laser plane oriented perpendicular to the transport plane and parallel to the first laser plane, wherein the second laser plane produces a second laser stripe where the second laser plane strikes an object;

a camera disposed above the transport plane and offset from the first laser plane generator and the second laser plane generator, the camera comprising an imager and a lens and having a field of view (FOV) directed downward toward the transport plane and at an angle to the first laser plane and to the second laser plane, the camera configured to capture first image data of an object as the object passes through the first laser plane and to capture second image data of the object as the object passes through the second laser plane, wherein a position of one of the first laser stripe within the first image data and the second laser strip within the second image data, relative to a position of an optical center within the first image data and the second image data, is used to determine one or more dimensions of the object.

* * * * *

UNITED STATES PATENT AND TRADEMARK OFFICE
CERTIFICATE OF CORRECTION

PATENT NO. : 9,651,363 B2
APPLICATION NO. : 13/949016
DATED : May 16, 2017
INVENTOR(S) : WenLiang Gao, Bryan L. Olmstead and Alan Shearin Page 1 of 1

It is certified that error appears in the above-identified patent and that said Letters Patent is hereby corrected as shown below:

In the Claims

Column 23
Line 54, after "captured" delete "by the".

Column 29
Line 6, change "Z0" to --$Z_0$--.
Line 10, change "dz" to --$d_z$--.
Line 35, change "Z0" to --$Z_0$--.
Line 37, change "dx" to --$d_x$--.

Column 30
Line 40, change "object," to --object;--.
Line 50, change "data," to --data;--.
Line 52, change "data," to --data;--.

Column 31
Line 14, change "a" to --at--.
Line 24, change "a" to --at--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*